US009221064B2

(12) United States Patent
Hersam et al.

(10) Patent No.: US 9,221,064 B2
(45) Date of Patent: *Dec. 29, 2015

(54) SORTING TWO-DIMENSIONAL NANOMATERIALS BY THICKNESS

(71) Applicant: Northwestern University, Evanston, IL (US)

(72) Inventors: Mark C. Hersam, Wilmette, IL (US); Jung-Woo T. Seo, Evanston, IL (US); Joohoon Kang, Evanston, IL (US); Alexander A. Green, Boston, MA (US)

(73) Assignee: Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/528,729

(22) Filed: Oct. 30, 2014

(65) Prior Publication Data
US 2015/0283482 A1 Oct. 8, 2015

Related U.S. Application Data

(60) Continuation-in-part of application No. 14/507,240, filed on Oct. 6, 2014, now Pat. No. 9,114,405, which is a division of application No. 12/856,348, filed on Aug. 13, 2010, now Pat. No. 8,852,444.

(60) Provisional application No. 61/234,132, filed on Aug. 14, 2009.

(51) Int. Cl.
*B03D 3/00* (2006.01)
*B01D 21/26* (2006.01)
(Continued)

(52) U.S. Cl.
CPC *B03D 3/00* (2013.01); *B01D 21/26* (2013.01); *C01B 21/0648* (2013.01);
(Continued)

(58) Field of Classification Search
CPC .......... B03D 3/00; B01D 21/26; C01B 31/04; C01B 21/0648; C01B 31/0484; C01B 31/0492; C01B 2204/02; C01B 2204/04; C01B 2204/06; C01B 2204/28; C01G 29/006; C01G 39/06; C01G 41/00; C01P 2004/20; B82Y 30/00; B82Y 40/00
See application file for complete search history.

(56) References Cited

U.S. PATENT DOCUMENTS

| 7,449,133 B2 | 11/2008 | Gruner et al. |
| 2007/0284557 A1 | 12/2007 | Gruner et al. |

(Continued)

FOREIGN PATENT DOCUMENTS

| WO | 2006096613 | 9/2006 |
| WO | 2009018092 | 2/2009 |

(Continued)

OTHER PUBLICATIONS

Berger et al., "Electronic Confinement and Coherence in Patterned Epitaxial Graphene," Science, 312:1191-1196 (2006).

(Continued)

*Primary Examiner* — David A Reifsnyder
(74) *Attorney, Agent, or Firm* — Reinhart Boerner Van Deuren s.c.

(57) ABSTRACT

The present teachings provide, in part, methods of separating two-dimensional nanomaterials by atomic layer thickness. In certain embodiments, the present teachings provide methods of generating graphene nanomaterials having a controlled number of atomic layer(s).

15 Claims, 14 Drawing Sheets

(51) Int. Cl.
*C01B 31/04* (2006.01)
*C01B 21/064* (2006.01)
*C01G 29/00* (2006.01)
*C01G 39/00* (2006.01)
*C01G 41/00* (2006.01)
*C01G 39/06* (2006.01)
*B82Y 30/00* (2011.01)
*B82Y 40/00* (2011.01)

(52) U.S. Cl.
CPC ............ *C01B 31/04* (2013.01); *C01B 31/0484* (2013.01); *C01B 31/0492* (2013.01); *C01G 29/006* (2013.01); *C01G 39/06* (2013.01); *C01G 41/00* (2013.01); *B82Y 30/00* (2013.01); *B82Y 40/00* (2013.01); *C01B 2204/02* (2013.01); *C01B 2204/04* (2013.01); *C01B 2204/06* (2013.01); *C01B 2204/28* (2013.01); *C01P 2004/20* (2013.01)

(56) References Cited

U.S. PATENT DOCUMENTS

| 2008/0217588 | A1 | 9/2008 | Arnold et al. |
| 2009/0022649 | A1 | 1/2009 | Zhamu et al. |
| 2009/0061194 | A1 | 3/2009 | Green et al. |
| 2009/0071533 | A1 | 3/2009 | Choi et al. |
| 2009/0155578 | A1 | 6/2009 | Zhamu et al. |
| 2009/0173918 | A1 | 7/2009 | Hersam et al. |
| 2010/0072458 | A1 | 3/2010 | Green et al. |
| 2010/0173376 | A1 | 7/2010 | Ostojic et al. |

FOREIGN PATENT DOCUMENTS

| WO | 2009089268 | 7/2009 |
| WO | 2010022164 | 2/2010 |
| WO | 2011020035 | 2/2011 |

OTHER PUBLICATIONS

Blake et al., "Graphene-Based Liquid Crystal Device," Nano Letters, 8(6):1704-1708 (2008).
Eda et al., "Large-area ultrathin films of reduced graphene oxide as a transparent and flexible electronic material," Nature Nanotechnology, 3:270-274 (2008).
Green et al., "Solution Phase Production of Graphene with Controlled Thickness via Density Differentiation," Nano Letters, 9(12):4031-4036 (2009).
Green et al., "Emerging Methods for Producing Monodisperse Graphene Dispersions," J. Phys. Chem. Lett., 1:544-549 (2010).
Hamilton et al., "High-Yield Organic dispersions of Unfunctionalized Graphene," Nano Lett., 9(10): 3460-3462 (2009).
Hao et al., "Aqueous dispersions of TCNQ-anion-stabilized grapheme sheets," Chem. Commun., 6576-6578 (2008).
Hernandez et al., "High-yield production of grapheme by liquid-phase exfoliation of graphite," Nature Nanotechnology 3:563-568 (2008).
Joensen et al., "Single-Layer MoS2," Mat. Res. Bull., 21:457-461 (1986).
Kosynkin et al., "Longitudinal unzipping of carbon nanotubes to form graphene nanoribbons," Nature, 458:872-877 (2009).
Li et al., "Chemically Derived, Ultrasmooth Graphene Nanoribbon Semiconductors," Science, 319: 1229-1232 (2008).
Li et al., "Highly conducting graphene sheets and Langmuir-Blodgett films," Nature Nanotechnology, 3:538-542 (2008).
Lu et al., "Determination of Carbon Nanotube Density by Gradient Sedimentation," 1. Phys. Chem. B11 0:24371-24376 (2006).
Niyogi et al., "Solution Properties of Graphite and Graphene," J. Am. Chem. Soc., 128:7720-7721 (2006).
Novoselov et al., "Two-dimensional atomic crystals," PNAS, 102(30):10451-10453 (2005).
Ruoff, "Calling all chemists," Nature Nanotechnology, 3:10-11 (2008).
Stankovich et al., "Stable aqueous dispersions of graphitic nanoplatelets via the reduction of exfoliated graphite oxide in the presence of poly(sodium 4-styrenesulfonate)," J. Mater. Chem., 16:155-158 (2006).
Stankovich et al., "Graphene-based composite materials," Nature, 442:282-286 (2006).
Stankovich et al., "Synthesis of graphene-based nanosheets via chemical reduction of exfoliated graphite oxide," Carbon, 45:1558-1565 (2007).
Viculis et al., "Intercalation and exfoliation routes to graphite nanoplatelets," J. Mater. Chern., 15:974-978 (2005).
Wang et al., "Transparent, Conductive Graphene Electrodes for Dye-Sensitized Solar Cells," Nano Letters, 8 (1 ):323-327 (2008).
Worsley et al., "Soluble graphene derived from graphite fluoride," Chemical Physics Letters, 445:51-56 (2007).
Wu et al., "Synthesis of high-quality graphene with a pre-determined number of layers," Carbon, 47:493-499 (2009).
Yu et al., "Graphite Nanoplatelet-Epoxy Composite Thermal Interface Materials," J. Phys. Chem. C., 11 (21):7565-7569 (2007).
Yu et al., "Separation of Mixed SWNTs and MWNTs by Centrifugal Force—an Experimental Study," IEEE, 1212-1216 (2007).
Zhang et al., "Experimental observation of the quantum Hall effect and Berry's phase in graphene," Nature, 438 (10):201-204 (2005).

Figure 7A
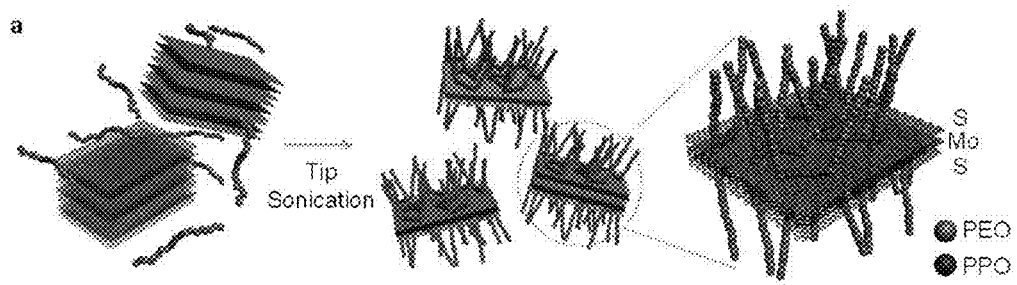
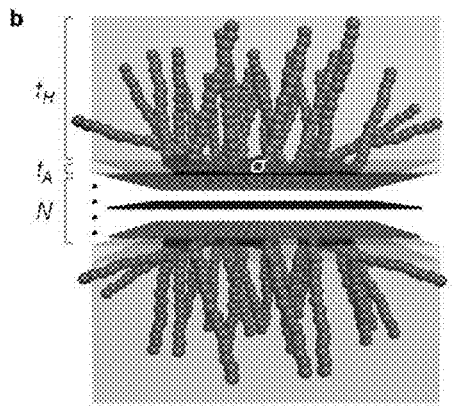
Figure 7B
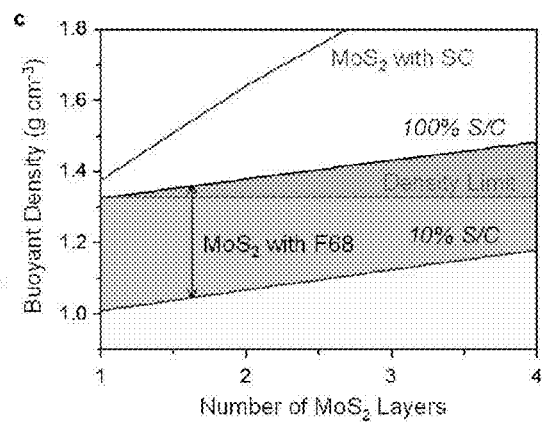
Figure 7C

Figure 8A
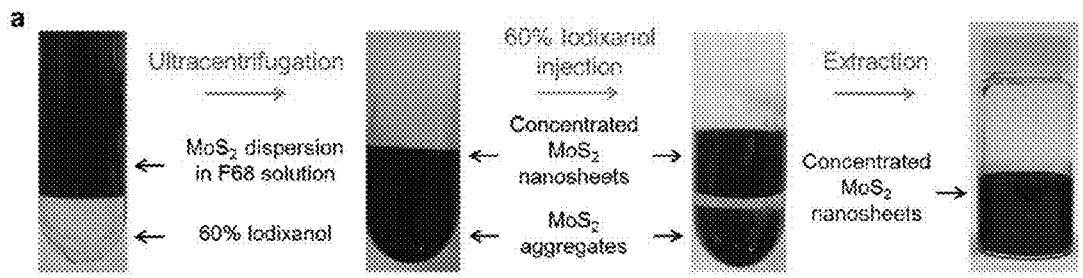
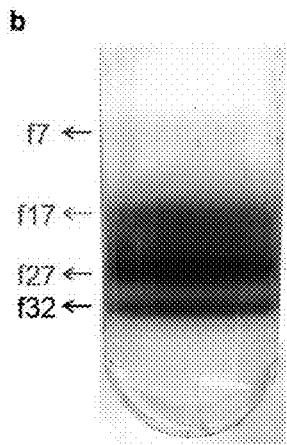
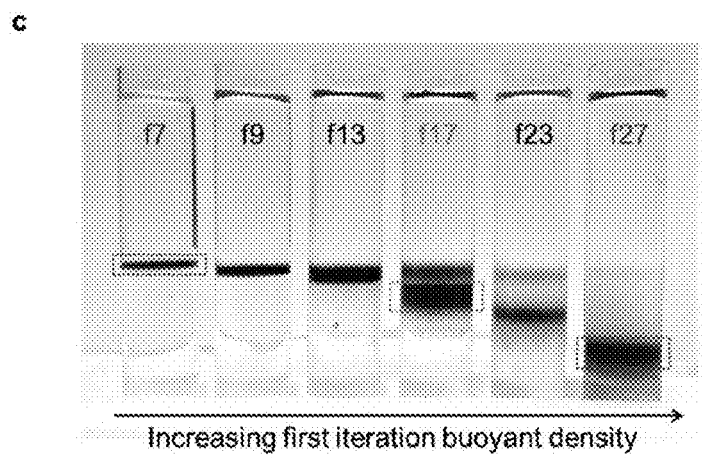
Figure 8B                Figure 8C

Figure 9A
Figure 9B
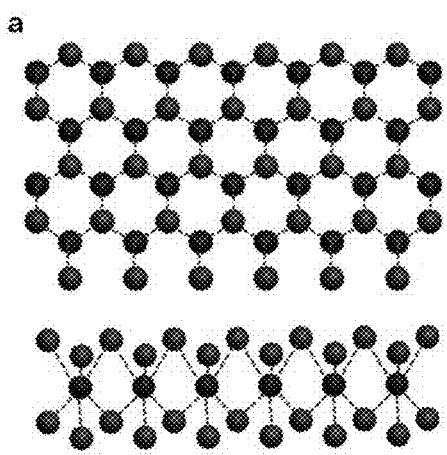
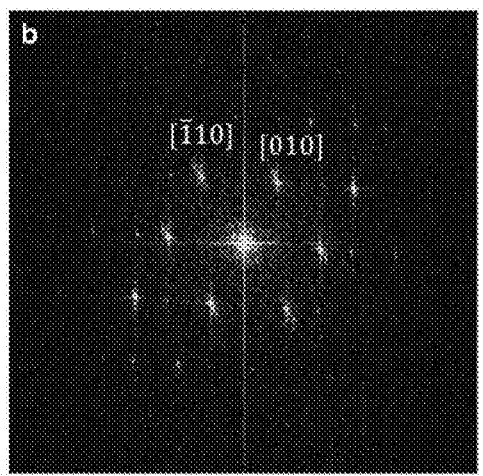
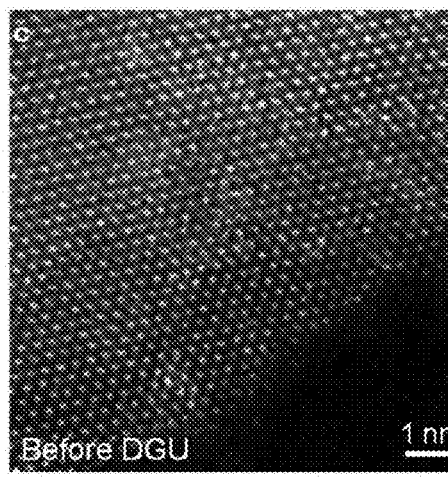
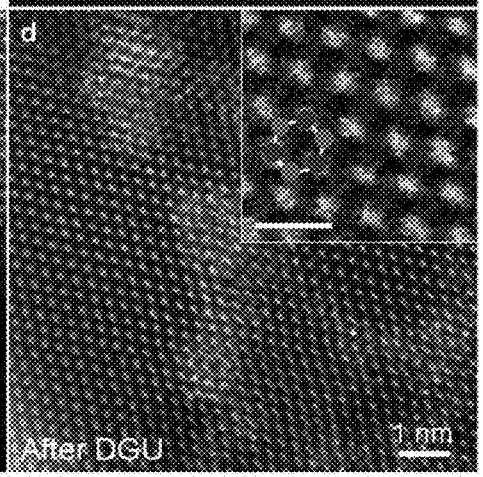
Figure 9C
Figure 9D Figure 10B                    Figure 10C Figure 14A
Figure 14B
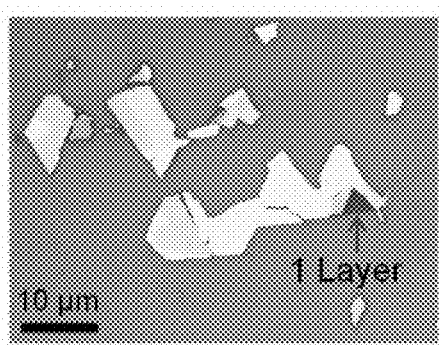
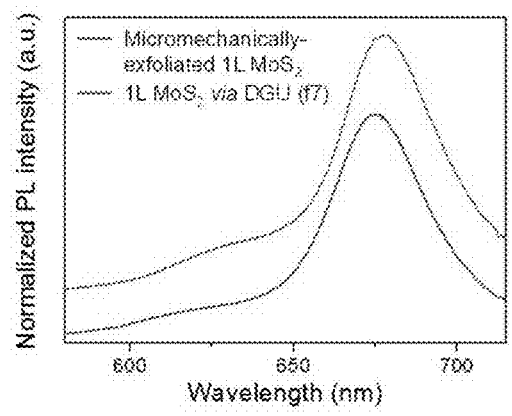

SORTING TWO-DIMENSIONAL NANOMATERIALS BY THICKNESS

This application is a continuation in part of and claims priority to and the benefit of application Ser. No. 14/507,240 filed Oct. 6, 2014 now allowed, which is a divisional of and claimed priority to and the benefit of application Ser. No. 12/856,348 filed Aug. 13, 2010 and issued as U.S. Pat. No. 8,852,444 on Oct. 7, 2014, which claimed priority to and the benefit of provisional application Ser. No. 61/234,132, filed on Aug. 14, 2009, each of which is incorporated by reference herein in its entirety.

This invention was made with government support under grant numbers DMR-0520513, EEC-0647560, DMR-0706067, DMR-1006391 and DMR-1121262 awarded by the National Science Foundation and grant numbers N00014-09-1-0180 and N00014-09-1-0795 awarded by the Office of Naval Research. The government has certain rights in the invention.

BACKGROUND OF THE INVENTION

Two-dimensional nanomaterials have emerged as promising materials in field-effect transistors, structurally reinforced composites, chemical/biological sensors, and transparent conductors. Among them, monolayer graphene, a two-dimensional single-atomic layer of carbon, has generated considerable attention as a result of its outstanding electronic, mechanical, and chemical properties. Since its discovery in 2004, monolayer graphene has demonstrated an array of impressive properties, such as charge carrier mobilities in excess of 10,000 cm$^2$ V$^{-1}$s$^{-1}$ (see Zhang et al., *Nature*, 438: 201 (2005)), the quantum Hall effect at room temperature (see Novoselov et al., *Science*, 315: 1379 (2007)), and a variable band gap depending on adsorbate coverage (see Ohta et al., *Science*, 313: 951 (2006)). Other two-dimensional nanomaterials also have been studied, including those derived from boron nitride (BN), transition metal dichalcogenides, graphite oxide, and the high temperature superconductor $Bi_2Sr_2CaCu_2O_x$. Further, the semiconducting properties of single flakes of molybdenum disulfide ($MoS_2$) and graphene oxide have been exploited in field-effect transistors.

Despite the technological potential of two-dimensional nanomaterials, methods of synthesizing and purifying them are in their infancy. The most common of these methods, known as micromechanical cleavage, involves drawing a layered crystallite such as graphite over a substrate of interest leaving thin crystallites on the surface (see Novoselov et al., *Proc. Nat. Acad. Aci. U.S.A.*, 102: 10451 (2005)). Although micromechanical cleavage can produce samples of high crystal quality, it has several disadvantages. First, it is difficult to control the position at which crystallites will be placed; consequently, considerable effort is required to locate them. Second, cleavage does not provide control over the thickness of flakes produced, resulting in a limited number of atomically thin crystallites with the majority being tens of nanometers thick. Third, the prospects for large scale production of graphene and other crystallites through micromechanical cleavage are unfavorable.

Other groups have studied epitaxial growth of two-dimensional nanomaterials on various substrates. For example, graphene can be grown directly on metal surfaces or through thermal decomposition of SiC (see Berger et al., *Science*, 312: 1191 (2006)). However, while these epitaxial graphene samples have the benefit of spanning large areas, full control over the thickness of the resulting crystallites remains a challenge. Moreover, because epitaxial synthesis can occur only on suitable growth substrates, methods of transferring crystallites to other substrates are required for practical applications.

Solution-based methods represent a third route to two-dimensional nanomaterials and can offer several significant advantages over the two approaches described above. First, the desired two-dimensional nanomaterials often can be generated from inexpensive and readily available starting materials. Second, solution-phase techniques do not require transfer from the growth substrate, and can employ existing technologies for scaling up to large volume processing. Several of these methods involve intercalation of graphite and transition metal dichalcogenide crystallites followed by sonication or rapid heating to generate thin flakes (see Viculis et al., *J. Mater. Chem.*, 15: 927 (2005); Yu et al., *J. Phys. Chem. C*, 111: 7565 (2007); and Joensen et al., *Mater. Res. Bull.*, 21: 457 (1986)). Yet, because of the often violent reactions between the intercalation compounds and water or other solvents, the resulting crystallites usually are at least partially oxidized or otherwise have defect sites which impair their properties (see Li et al., *Science*, 319, 1229 (2008)).

With respect to the production of monolayer graphene, several groups have explored exfoliating functionalized graphite, such as graphite oxide and graphite fluoride. Unlike pristine graphite, graphite oxide is hydrophilic, and individual graphene oxide layers can be dispersed readily into water. However, graphene oxide is insulating. To regain their electrical conductivity, the exfoliated functionalized graphite materials must be chemically reduced. Despite these treatments, the electronic properties of reduced graphene oxide remain different from those of pristine graphene (see e.g., Tung et al., *Nature Nanotech.*, 4: 25 (2009)). Furthermore, while it is possible to generate monolayer graphene oxide by ensuring that graphite is sufficiently oxidized, it is unlikely that bilayer graphene oxide (or n-layer graphene oxide) could be formed preferentially through controlled oxidation. Graphene nanomaterials have diverse properties depending on the number of layers. For example, monolayer graphene is a 0 eV bandgap semiconductor. Bilayer graphene, on the other hand, has been shown to have a tunable bandgap in the infrared. Meanwhile, trilayer graphene is a semimetal whose band overlap can be controlled by an applied electric field.

Accordingly, there is a need in the art for methods of preparing and purifying two-dimensional nanomaterials with controlled number of layers. In particular, there is a need in the art for methods of preparing and purifying graphene nanomaterials with controlled number of layers, including methods of preparing monolayer graphene and isolating it from other graphene nanomaterials having two or more layers. In addition, there is a need in the art for methods that enable effective dispersion of graphite or graphene in a fluid medium, particularly in water, such that the dispersion can remain stable for an extended period of time.

SUMMARY OF THE INVENTION

In light of the foregoing, the present teachings provide one or more methods and/or compositions related to generating nanomaterials having controlled thickness or number of atomic layers, which methods and compositions can overcome various deficiencies and shortcomings of the prior art, including those outlined above.

In one aspect, the present teachings can be directed to sorting two-dimensional (planar) nanomaterials by atomic layer thickness. Specifically, a polydisperse population of planar nanomaterials which is polydisperse at least with respect to thickness can be first contacted with one or more surface active components to provide a nanomaterial composition. In various embodiments, the nanomaterial composition is a stable dispersion of the nanomaterials in water, in which the nanomaterials are dispersed effectively by the one or more surface active components. The one or more surface active components can be selected for their ability to associate differentially with the nanomaterials of different thickness such that individual nanomaterial crystallite or flake of different thickness, upon association with the surface active components, can exhibit different buoyant densities in a fluid medium. Separation by buoyant density subsequently can be accomplished by, but is not limited to, density gradient ultracentrifugation, after which physically separated nanomaterials, grouped according to atomic layer thickness, can be recovered.

Generally, density gradient ultracentrifugation (DGU) involves introducing the dispersion into a density gradient medium, that is, a fluid medium that includes a density gradient. The density gradient can include a linear gradient including three or more layers of different densities. Once introduced, the fluid medium can be agitated, for example, by ultracentrifugation, to allow separation of the nanomaterials by thickness along the density gradient. After sufficient agitation, nanomaterials of different thickness are allowed to settle into a plurality of separation fractions, where at least one of the separation fractions is enriched with nanomaterials of a specific thickness. For example, a first separation fraction can be enriched with monolayer nanomaterials, a second separation fraction can be enriched with bilayer nanomaterials, a third separation fraction can be enriched with trilayer nanomaterials, and so on. The separation fractions can be visibly distinguishable among each other by human eye, or can be distinguishable outside the visible spectrum by various light scattering or spectroscopic methods. For example, two or more separation fractions can be distinguishable by different colors and/or different shades of a particular color in the visible spectrum. Further, the two or more separation fractions can be separated from each other by a layer of fluid medium in which only a negligible amount of nanomaterials is present. For separation fractions that are enriched with monolayer, bilayer, and/or trilayer nanomaterials, the mean thickness of the nanomaterials in such enriched separation fractions can be expected to be less than the mean thickness of the nanomaterials in the starting nanomaterial composition, which includes a non-negligible amount of nanomaterials having four layers or more. For example, the mean thickness of the nanomaterials in the starting nanomaterial composition can be about 5 nm or greater, and the mean thickness of the nanomaterials in an enriched separation fraction can be between about 1 nm and 3 nm.

As used herein, the "mean thickness" is the average thickness of nanomaterials in a sample otherwise known as the arithmetic mean. Typically, an enriched separation fraction also can have a mode thickness that is less than the mode thickness of the nanomaterials in the starting nanomaterial composition. As used herein, the "mode thickness" is the thickness with the highest frequency in a sample. For example, the mode thickness of the nanomaterials in an enriched separation fraction can be less than 2 nm, whereas the mode thickness of the nanomaterials in the polydispersion population can be 4 nm or greater.

A single separation cycle according to the present methods often leads to enrichment that is satisfactory for most applications. Accordingly, following one separation cycle, one or more separation fractions can be collected from the density gradient and used for various applications. However, performing one or more additional sorting or separation cycles can improve the quality of the separation and provide increasingly enriched separation fractions.

In another aspect, the present teachings relate to producing aqueous dispersions of two-dimensional (planar) hydrophobic nanomaterials. In contrast to the prior art, the present teachings provide stable aqueous dispersions of two-dimensional hydrophobic nanomaterials without chemical modification such as oxidation. Instead, stable aqueous dispersions are obtained by providing the hydrophobic nanomaterials in composition with one or more surface active components described herein, in particular, surface active components having one or more planar organic groups. Without wishing to be bound by any particular theory, it is believed that one or more surface active components described herein can encapsulate individual flakes of nanomaterials and allow a large amount of the nanomaterials to be effectively dispersed in water. For example, aqueous dispersions having a minimum concentration of 40 µg/mL of nanomaterials according to the present teachings can remain stable for weeks without visible aggregation.

Other objects, features, and advantages of the present teachings will be more fully understood from the following figures, description, examples, and claims.

BRIEF DESCRIPTION OF THE DRAWINGS

It should be understood that certain drawings are not necessarily to scale, with emphasis generally being placed upon illustrating the principles of the present teachings. The drawings are not intended to limit the scope of the present teachings in any way.

FIGS. 7A-C. Schematic illustration of the $MoS_2$ exfoliation process and buoyant density model. (A) Schematic of the $MoS_2$ exfoliation process in aqueous solution. In particular, $MoS_2$ flakes are exfoliated and dispersed by Pluronic F68 during tip ultrasonication. The brown and purple atoms are sulfur and molybdenum, and the green and blue spheres are PEO and PPO chains, respectively. (B) Buoyant density model for F68-encapsulated $MoS_2$ in aqueous solution, where N is the number of $MoS_2$ layers, $t_A$ is the anhydrous layer thickness, $t_H$ is the hydration shell thickness, and σ is the packing density. (C) Buoyant density model as a function of $MoS_2$ flake thickness. Lines represent scenarios where $MoS_2$ is encapsulated with F68 and sodium cholate (SC), respectively. The area enclosed by the two black lines indicates the possible buoyant density range that depends on the surface coverage of Pluronic F68 on $MoS_2$. Isopycnic DGU separation of $MoS_2$ is only possible when the surfactant-encapsulated $MoS_2$ nanosheets have a buoyant density below the density limit imposed by the density gradient medium (dashed-line).

FIGS. 8A-C. Digital images of the experimental procedure. (A) Images of the concentration step for $MoS_2$ nanosheets. After ultrasonication, the $MoS_2$ dispersion is placed on top of 60% w v$^{-1}$ iodixanol as a step gradient and then ultracentrifuged at 32 krpm for 24 hours. Subsequently, 60% w v$^{-1}$ iodixanol is injected to separate the concentrated $MoS_2$ nanosheets from the aggregates, and then extracted. The dispersion, gradient, and injection solution all contain 2% w v$^{-1}$ F68. (B) Image of $MoS_2$ bands in an ultracentrifuge tube after the first iteration of density gradient ultracentrifugation (DGU). The concentrated $MoS_2$ solution was diluted by a factor of eight prior to ultracentrifugation to reveal the position of each band more clearly. (C) Image of the ultracentrifuge tubes after the second iteration of DGU. Fractions from the well-defined bands (f7, f17, and f27) and the relatively wider bands (f9, f13, and f23) from the first iteration are collected and used for the second iteration. The fractions from the dashed region are used for characterization.

FIGS. 9A-D. Atomic structure of $MoS_2$ before and after DGU. (A) Schematic illustration of the 2H semiconducting crystal structure of $MoS_2$ shown from out-of-plane and perspective view (Blue: Mo, Brown: S). (B) Fast Fourier Transform of the STEM images. (C), (D) HAADF-STEM images of $MoS_2$ flakes before and after DGU, respectively. The inset image shows the magnified STEM image after DGU. The blue and brown spheres indicate the position of Mo and S atoms, respectively (scale bar=0.5 nm).

FIGS. 10A-C. Characterization of thickness and area distribution. (A) Atomic force microscopy (AFM) images of $MoS_2$ nanosheets from f7 and f17 on a $SiO_2$ substrate and the corresponding height profiles along the dashed lines (scale bar=100 nm). (B) Flake thickness and (C) flake area histograms for f7, f17, and f27 fractions obtained from the AFM images.

FIGS. 14A-B. Photoluminescence spectra comparison. Optical microscopy image (A) of micromechanically exfoliated $MoS_2$ and PL intensity comparison (B) between micromechanically exfoliated monolayer $MoS_2$ and sorted $MoS_2$ (f7) via DGU.

DETAILED DESCRIPTION OF CERTAIN EMBODIMENTS

Figure 1A:
FIG. 1A is a schematic illustration of the solution-phase exfoliation process according to the present teachings.

Throughout the description, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps.

In the application, where an element or component is said to be included in and/or selected from a list of recited elements or components, it should be understood that the element or component can be any one of the recited elements or components or can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," "having," "contain," "contains," or "containing" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

As used herein, a "planar nanomaterial" or a "two-dimensional nanomaterial" refers to a planar structure having a thickness on the order of nanometers, generally 100 nm or less, for example, less than about 50 nm, usually less than about 10 nm, and in some embodiments, less than about 5 nm thick. The thickness of the present planar nanomaterials can be measured in terms of the number of atomic or molecular layers, and can have one to about 50 atomic or molecular layers. For example, the planar nanomaterials of the present teachings can include monolayer nanomaterials, that is, nanomaterials consisting of a single atomic or molecular layer; bilayer nanomaterials, that is nanomaterials consisting of two atomic or molecular layers; trilayer nanomaterials, that is nanomaterials consisting of three atomic or molecular layers; and few-layer nanomaterials, which refer to planar nanomaterials consisting of four to about ten atomic or molecular layers. Typically, planar nanomaterials of the present teachings have large length-to-thickness and/or width-to-thickness ratio(s). For example, a planar nanomaterial of the present teachings can have a length in the range of about 1 μm to 20 μm, in which case, the length-to-thickness ratio is on the order of $10^3$ or larger. In embodiments where the present planar nanomaterials have a large aspect ratio (large length-to-width ratio), for example, when the nanomaterials have a nanoscale width in addition to the nanoscale thickness, the nanomaterials can be referred herein as "nanoribbons." In other embodiments, the present planar nanomaterials can be referred herein as "nanosheets" or "nanoflakes" (or simply "flakes") with the former generally having larger length and width dimensions than the latter.

The present teachings can be practiced on various elemental or molecular nanomaterials including those composed of carbon, BN, transition metal dichalcogenides such as $WS_2$ and $MoS_2$, and the high temperature superconductor $Bi_2Sr_2CaCu_2O_x$. In various embodiments, the present planar nanomaterials can include graphene nanomaterials. As used herein, "graphene nanomaterials" include n-layer graphene nanomaterials, wherein n is an integer in the range of 1 to 10, and specifically include monolayer graphene (n=1), bilayer graphene (n=2), trilayer graphene (n=3), and few-layer graphene (n=4-10) nanomaterials. As understood by those skilled in the art, monolayer graphene is a one atomic layer (or monolayer) thick planar sheet of $sp^2$-bonded carbon atoms that are densely packed in a honeycomb crystal lattice, whereas p-layer graphene nanomaterials (n=2-10) have stacked planar structures consisting of two to ten graphene sheets. In various embodiments, graphite (e.g., naturally occurring crystalline flake graphite) can be used as the starting material for preparing graphene nanomaterials including monolayer graphene. However, other forms of graphite including synthetic forms of graphite (e.g., highly ordered pyrolytic graphite (HOPG)) also can be used. As understood by those skilled in the art, graphite is a three-dimensional layered material consisting of many (usually hundreds or more of) stacked graphene sheets and has a typical thickness that is greater than 100 nm. As such, graphene and graphite, as used herein, do not encompass other non-planar allotropes of carbon such as carbon nanotubes which are very different from graphene and graphite not only in terms of shape but also physical, chemical, optical, and electronic properties. While the description and examples herein may refer specifically to graphene and graphite, the present teachings are intended to encompass two-dimensional planar nanomaterials in general regardless of their composition.

As used herein, a "population" of nanomaterials can include greater than about $10^8$, greater than about $10^9$, greater than about $10^{10}$, greater than about $10^{11}$, greater than about $10^{12}$, greater than about $10^{13}$, greater than about $10^{14}$, greater than about $10^{15}$, greater than about $10^{16}$, or greater than about $10^{17}$ nanoribbons, nanosheets, or nanoflakes. Further, by weight, a population of nanomaterials can have a mass of about 0.001 μg, greater than about 0.01 μg, greater than about 0.1 μg, greater than about 1 μg, greater than about 10 μg, greater than about 100 μg, greater than about 1 mg, greater than about 10 mg, greater than about 100 mg, or greater than about 1 g. In certain embodiments of the present teachings, a separation cycle can be used to sort bulk quantities of nanomaterials, for example, populations of nanomaterials that include more than about $10^{12}$, more than about $10^{13}$, more than about $10^{14}$, more than about $10^{15}$, more than about $10^{16}$ or more than about $10^{17}$ nanoribbons, nanosheets, or nanoflakes; or more than about 10 μg, more than about 100 μg, more than about 1 mg, more than about 10 mg, more than about 100 mg, or more than about 1 gram of nanomaterials by mass.

As used herein, "enrichment" or "enriched" refers to an increase in the statistical proportion of nanomaterials comprising one or more specific characteristics in a fraction (or subpopulation) obtained from a sample population as compared to the sample population as a whole. As described herein, a nanomaterial subpopulation that is "enriched" according to the present teachings by one or more properties, such as thickness, shape, aspect ratio, or combinations thereof, means that the subpopulation (i.e., the enriched population) has a higher percentage of nanomaterials having the one or more properties when compared to the starting population (i.e., the mixed population) from which the subpopulation is derived. For example, a starting population of planar nanomaterials can exhibit polydispersity in thickness and can include monolayer, bilayer, trilayer, and few-layer (n≥4) planar nanomaterials. Using methods of the present teachings, a subpopulation derived from the polydisperse population can be enriched with monolayer, bilayer, and/or trilayer planar nanomaterials and as a result of which, have a reduced mean thickness compared to the starting population.

Various methods have been used to different degrees of success for separating carbon nanotubes by one or more characteristics such as chirality, diameter, and electronic type. However, the extension of separation methods for carbon nanotubes to graphene nanomaterials by one or more selected properties has not been described in the literature. Because of their geometrical differences (planar versus tubular) and different properties such as surface energy, optical properties, and electronic properties, graphene can be expected to respond very differently to a particular separation method when compared to carbon nanotubes. For example, to the inventors' knowledge, there has been no reported method for separating graphene nanomaterials by thickness that allows isolation of monolayer graphene from bilayer, trilayer, and/or few-layer graphene nanomaterials. In addition, when graphene nanomaterials are generated in situ from graphite, in particular by exfoliation in aqueous systems, further challenges exist with regard to dispersing the highly hydrophobic graphite at sufficiently high concentrations.

Accordingly, in one aspect, the present teachings provide a solution-phase method for generating two-dimensional planar nanomaterials from three-dimensional crystalline materials. For example, using methods of the present teachings, two-dimensional planar nanomaterials can be generated from three-dimensional crystalline materials including, but not limited to, graphite, $MoS_2$, and BN crystallites. The resulting two-dimensional planar nanomaterials subsequently can be separated by thickness using density gradient ultracentrifugation (DGU) as described in further detail below.

According to the present teachings, the starting three-dimensional materials are first exfoliated into two-dimensional planar nanomaterials having ten or less atomic or molecular layers. More specifically, in the first stage of the exfoliation process, the three-dimensional starting materials are added to a fluid medium containing one or more surface active components to provide a dispersion. The dispersion containing the starting materials and the surface active components is then subjected to a non-thermal, non-oxidative agitation process to exfoliate the three-dimensional materials into two-dimensional nanomaterials. More specifically, ultrasonic agitation (or ultrasonication) can be used to induce effective exfoliation.

In various embodiments, the three-dimensional starting materials can be from a natural source. For example, graphite and $MoS_2$ (in the form of molybdenite) can be mined from ores. In certain embodiments, the three-dimensional layered materials can be pristine (i.e., as naturally-occurring or as-synthesized) and have not been subjected to post-extraction or post-synthesis treatment (e.g., thermal treatment at a temperature above 100° C. and/or chemical modification such as treatment under oxidative (acidic) and/or reducing conditions). For example, the starting materials can be pristine graphite flakes, which are to be differentiated from graphite oxide, graphite fluoride, or other functionalized forms of graphite. In addition, to increase the yield of exfoliated nanomaterials, the starting materials can be provided in powder form, although in certain embodiments, bulk crystals also can be used.

It has been found that a variety of surface active components are effective at dispersing both the three-dimensional starting materials and the exfoliated two-dimensional planar nanomaterials. For example, anionic surfactants such as bile salts and alkali salts of alkyl sulfate and alkyl benzene sulfonate; and cationic surfactants such as quaternary ammonium salts have been found effective and useful in accordance with the present teachings. In addition, polymers including cyclic groups in the backbone and/or the side chains such as polyvinylpyrrolidone and carboxymethylcellulose; non-ionic block copolymers of oxyethylene and oxypropylene; and polymers including one or more polyoxyethylene chains such as polyoxyethylene alkylphenyl ethers and polyoxyethylene sorbitan alkyl ethers have been found useful.

In certain embodiments, surface active components that include one or more planar organic groups can be particularly useful both for effectively dispersing the starting materials and subsequently enabling separation of the nanomaterials by thickness. Without wishing to be bound by any particular theory, it is believed that surface active components which have one or more planar organic groups can intercalate between the layers of the three-dimensional layered materials more effectively, thereby promoting exfoliation and increasing the yield of two-dimensional planar nanomaterials, in particular, monolayer nanomaterials. Accordingly, in certain embodiments, the one or more surface active components can include an amphiphilic non-polymeric compound having a planar hydrophobic core and one or more hydrophilic groups.

For example, the one or more surface active components can include a compound having a cyclic (e.g., carbocyclic) core and one or more charged groups, particularly, a benzene group or a sterane group and one or more anionic groups selected from hydroxyls, carboxylates, sulfates, sulfonates, and combinations thereof. In particular embodiments, the one or more surface active components can include one or more bile salts and/or an alkali salt of linear alkyl benzenesulfonate such as sodium dodecylbenzenesulfonate. Bile salts can be more broadly described as a group of molecularly rigid and planar amphiphiles with one or more charged groups opposing a hydrophobic face. Examples of bile salts include salts (e.g., sodium or potassium salts) of conjugated or unconjugated cholates and cholate derivatives including deoxycholates, chenodeoxycholates, taurodeoxycholates, glycochenodeoxycholates, ursodeoxycholates, and glycoursodeoxycholates. In certain embodiments, the one or more surface active components can include a polymer having one or more cyclic groups in its backbone and/or side chains. For example, polyvinylpyrrolidones over a large molecular weight range (e.g., between about 5 kDa and about 1500 kDa) have been found useful. It also has been discovered that sodium carboxymethylcelluose is particularly effective as a surface active component for dispersing hydrophobic two-dimensional nanomaterials, despite the fact that the glucose rings in the polysaccharide can assume both planar and non-planar configurations.

Other useful surface active components include alkyl sulfates such as sodium hexyl sulfate, sodium octyl sulfate, sodium decyl sulfate, sodium undecyl sulfate, sodium dodecyl sulfate, and lithium dodecyl sulfate; quaternary ammonium salts such as dodecyltrimethylammonium bromide, myristyltrimethylammonium bromide, hexadecyltrimethylammonium bromide, hexadecyltrimethylammonium chloride, and hexadecyltrimethylammonium hydrogen sulfate; polyoxyethylene alkylphenyl ethers such as Triton® X-100; polyoxyethylene sorbitan alkyl ethers such as Tween® 20 and Tween® 85; poloxamers (or non-ionic triblock copolymers of oxyethylene and oxypropylene known under the trade name Pluronic®) which can be represented by the general formula $HO(C_2H_4O)_a(C_3H_6O)_b(C_2H_4O)_aH$, wherein a and b are integers in the range of 10 to 300; and non-ionic tetrafunctional block copolymers of oxyethylene and oxypropylene known under the trade name Tetronic®.

State-of-the-art exfoliation methods for preparing nanomaterials often are performed in expensive organic solvents due to the highly hydrophobic nature of most planar nanomaterials and their starting materials. By using the surface active components described herein, it was surprisingly found that highly hydrophobic materials such as graphite and graphene can be uniformly dispersed in water at high concentrations. For example, for the initial exfoliation step, graphite can be effectively dispersed at concentrations higher than about 50 mg/mL in an aqueous solution containing the surface active components. The fact that the present methods can be practiced with a high concentration of the starting materials help ensure a high throughput of the process. In addition, aqueous dispersions of graphene in composition with one or more surface active components described herein can have a graphene concentration higher than about 0.10 mg/mL, higher than about 0.20 mg/mL, higher than about 0.30 mg/mL, higher than about 0.40 mg/mL, higher than about 0.50 mg/mL, higher than about 0.60 mg/mL, higher than about 0.70 mg/mL, higher than about 0.80 mg/mL, higher than about 0.90 mg/mL, or higher than about 0.95 mg/mL and remain stable (e.g., without visible aggregation) for at least two weeks, for at least three weeks, for at least one month, or for at least two months. Stable aqueous dispersions of $MoS_2$ and BN also can be obtained similarly with one or more surface active components described herein.

In embodiments where the present methods are used to generate graphene nanomaterials, planar surface active components such as sodium cholate, sodium carboxymethylcellulose, and other surface active components including one or more planar organic groups can be used. Both the starting layered materials (i.e., graphite) and the exfoliated nanomaterials (i.e., graphene nanomaterials) can form a complex with the surface active components. According to the present methods, sodium cholate and other surface active components are not intended to chemically modify or functionalize the starting materials or the exfoliated nanomaterials. Instead, the one or more surface active components typically are selected to ensure non-covalent association with the materials, whether it is by ionic interaction, π-π orbital interaction, hydrogen bonding, Van Der Waals interaction, or combinations thereof. In some embodiments, the materials can be considered as being "encapsulated" by the surface active components. As used herein, "encapsulate," "encapsulated," or "encapsulating" refers to non-covalent association with a target. For example, the one or more surface active components can arrange themselves as a sheet and cover at least 50% of one or more surfaces of the target. In certain embodiments, the one or more surface active components can form an ordered layer on each side of the target, yet not be present at one or more edges of the target.

Figure 1B:
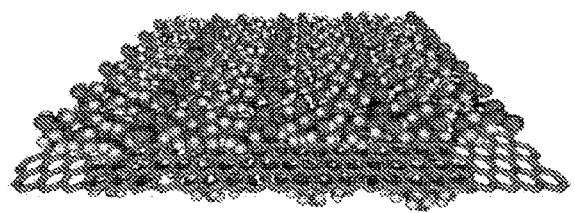
FIG. 1B is a schematic illustration of a monolayer two-dimensional nanomaterial encapsulated by an ordered monolayer of surface active components on each side.

FIG. 1A is a schematic illustration of the solution-phase exfoliation process according to the present teachings. In particular, the exfoliation process can be performed in an aqueous solution containing one or more surface active components. For example, a three-dimensional layered material such as graphite flakes can be combined with a surface active component such as sodium cholate in an aqueous solution. Horn ultrasonication then can be used to exfoliate the three-dimensional graphite flakes into graphene nanomaterials that are encapsulated by the surface active components. FIG. 1B provides a schematic illustration of a monolayer nanoflake (e.g., monolayer graphene) encapsulated by an ordered monolayer of surface active components (e.g., sodium cholate) on each side.

Following ultrasonication, the sonicated dispersion can include two-dimensional nanomaterials as well as three-dimensional materials. Among the two-dimensional nanomaterials, there can be a polydisperse population of monolayer nanomaterials, bilayer nanomaterials, trilayer nanomaterials, and higher-order few-layer nanomaterials. Before separating the two-dimensional nanomaterials by thickness, the three-dimensional materials can be removed and/or the sonicated dispersion can be concentrated to improve the quality of the separation process.

For example, the sonicated dispersion can be subjected to sedimentation centrifugation. In various embodiments, the sonicated dispersion can be centrifuged at about 21,000 relative centrifugal force for several minutes to remove fast sedimenting large crystallites from the dispersion. The supernatant then can be recovered to form a base dispersion. The crystallites in the base dispersion can comprise a concentration of at least about 0.05 mg/mL and be stable. For example, the crystallites in the recovered base dispersion may not show signs of reaggregation for at least two weeks following their initial dispersion.

Following the procedures described above, a well-dispersed aqueous solution of two-dimensional nanomaterials can be obtained. Because the nanomaterials provided by the present teachings are produced without any covalent chemical modification, the nanomaterials of the present teachings can offer greater crystallinity and environmental stability than those obtained using prior art methods such as intercalation. Aqueous dispersions of the present two-dimensional nanomaterials can be used for controlled deposition using methods previously developed to deposit other nanomaterials such as carbon nanotubes and inorganic nanowires. Such deposition methods include dielectrophoresis (see R. Krupke et al., *Science* 301, 344 (2003)), self-assembled monolayer mediated adhesion (see M. Burghard et al., *Adv. Mater.* 10, 584 (1998)), and Langmuir-Blodgett assembly (see X. Li et al., *J. Am. Chem. Soc.* 129, 4890 (2007)). Atomic force microscopy (AFM) images of thin films deposited onto $SiO_2$-capped Si wafers from base dispersions according to the present methods confirm the presence of crystallites with thicknesses ranging from about 1 nm to about 10 nm.

For further refinement, the base dispersions described above can be concentrated by ultracentrifugation in a step gradient. More specifically, a base dispersion can be layered on top of a dense underlayer, e.g., a dense underlayer of 60% w/v iodixanol, and ultracentrifuged in the resulting step gradient. Ultracentrifugation causes the nanomaterials in the base dispersion to sediment into the step gradient formed at the interface between the two layers, producing a concentrated band of two-dimensional nanomaterials that can be removed by fractionation. In addition to producing a concentrated dispersion of crystallites, ultracentrifugation in a step gradient also removes thick crystallites (including nanomaterials consisting of more than ten layers) whose buoyant density exceeds the density of the step gradient.

To provide two-dimensional nanomaterials having a controlled thickness (or number of atomic layer), the base dispersion or the concentrated dispersion can be subjected to density gradient ultracentrifugation (DGU). During DGU, the differences in the buoyant density of the two-dimensional nanomaterials and that of the surrounding medium drive the two-dimensional nanomaterials to their respective isopycnic points, where the buoyant density of a particular nanomaterial crystallite matches that of the surrounding medium. In particular, because monolayer nanomaterials, bilayer nanomaterials, trilayer nanomaterials, and higher-order few-layer nanomaterials have different buoyant densities upon association with the present surface active components, ultracentrifugation in a density gradient will cause the encapsulated nanomaterials to separate by thickness into distinct often visible bands (or separation fractions) of nanomaterials. For example, it was empirically found that the buoyant density of graphene nanomaterials increases with thickness when centrifuged in composition with sodium cholate; accordingly, the topmost separation fraction is expected to be enriched with monolayer graphene. To illustrate, after the sedimentation and/or the concentration step(s), the nanomaterial dispersion can include less than about 30% monolayer nanomaterials among all the graphene nanomaterials in the dispersion. After one iteration of the DGU process, the topmost separation fraction can include at least about 50%, at least about 60%, at least about 70%, at least about 80%, or at least about 90% monolayer nanomaterials among all the graphene nanomaterials in that topmost separation fraction.

Generally, density gradient ultracentrifugation uses a fluid medium with a predefined variation in its density as a function of position within a centrifuge tube or compartment (i.e., a density gradient). Fluid media useful with the present teachings are limited only by nanomaterial aggregation therein to an extent precluding at least partial separation. Accordingly, aqueous and non-aqueous fluids can be used in conjunction with any substance soluble or dispersible therein, over a range of concentrations, so as to provide the medium a density gradient for use in the separation techniques described herein. Such substances can be ionic or non-ionic, non-limiting examples of which include inorganic salts and alcohols, respectively. Such a medium can include a range of aqueous iodixanol concentrations and the corresponding gradient of concentration densities. As understood by those skilled in the art, aqueous iodixanol is a common, widely used non-ionic density gradient medium. However, other media can be used in methods of the present teachings, as would be understood by those skilled in the art.

More generally, any material or compound stable, soluble or dispersible in a fluid or solvent of choice can be used as a density gradient medium. A range of densities can be formed by dissolving such a material or compound in the fluid at different concentrations, and a density gradient can be formed, for instance, in a centrifuge tube or compartment. More practically, with regard to choice of medium, the two-dimensional nanomaterials in composition with the surface active components should be soluble, stable or dispersible within the fluids/solvent or resulting density gradient. Likewise, from a practical perspective, the maximum density of the gradient medium, as determined by the solubility limit of such a material or compound in the solvent or fluid of choice, should be at least as large as the buoyant density of the nanomaterial-surface active component complexes for a particular medium. Accordingly, any aqueous or non-aqueous density gradient medium can be used provided that the nanomaterials are stable; that is, do not aggregate to an extent precluding useful separation. Alternatives to iodixanol include inorganic salts (such as CsCl, $Cs_2SO_4$, KBr, etc.), polyhydric alcohols (such as sucrose, glycerol, sorbitol, etc.), polysaccharides (such as polysucrose, dextrans, etc.), other iodinated compounds in addition to iodixanol (such as diatrizoate, nycodenz, etc.), and colloidal materials (such as Percoll®). Other parameters which can be considered upon choice of a suitable density gradient medium include the diffusion coefficient and the sedimentation coefficient, both of which can determine how quickly a gradient redistributes during centrifugation. Generally, for more shallow gradients, a larger diffusion coefficient and a smaller sedimentation coefficient are desired.

It has been discovered that the point at which the encapsulated nanomaterials are introduced into the density gradient in the fluid medium can be important to the quality of the separation. In some embodiments, the encapsulated nanomaterials are introduced into the density gradient at a density that is expected to be greater than the buoyant density of any of the encapsulated nanomaterials. In some embodiments, the encapsulated nanomaterials are introduced into the density gradient at a density that is expected to be lower than the buoyant density of any of the encapsulated nanomaterials.

In certain embodiments, the nanomaterials (e.g., the concentrated dispersion) can be injected at the bottom of the linear density gradient and centrifuged. Under such condition, the nanomaterials are expected to move upwards to their isopycnic points and settle into multiple bands or separation fractions of nanomaterials. The nanomaterials in these separation fractions can be sufficiently monodisperse or selective for most applications, and therefore, can be collected and used 'as is' (optionally after removal of the surface active components) for processing into various composites and devices.

In certain embodiments, it can be desirable to purify further the separation fractions to improve their selectivity by performing additional iterations of the present methods. Specifically, a separation fraction can be provided in a composition with the same surface active component system or a different surface active component system, and the composition can be contacted with the same fluid medium or a different fluid medium, where the fluid medium can have a density gradient that is the same or different from the fluid medium from which the separation fraction was obtained. In certain embodiments, fluid medium conditions or parameters can be maintained from one separation to another. In other embodiments, at least one iterative separation can include a change of one or more parameters including the identity of the surface active component(s), medium identity, medium density gradient, and/or medium pH, as well as the duration and the rotational speed of the centrifugation process, with respect to one or more of the preceding separations. In certain embodiments, the surface active component(s) encapsulating the nanomaterials can be modified or changed between iterations, allowing for even further refinement of separation. Separation fractions isolated after each separation can be washed before further complexation and centrifugation steps are performed.

For example, after a first separation cycle where the nanomaterials (e.g., the concentrated dispersion) are injected at the bottom of the linear density gradient and centrifuged, one or more resulting separation fractions can be collected and be subjected to a second iteration of the DGU process. For this second iteration, the separation fractions can be loaded at the top of a second density gradient forcing the graphene nanomaterials to move downward in the centrifuge tube to their respective isopycnic points. This second DGU iteration can help remove slow-moving, low buoyant density materials that did not reach their isopycnic points in the first iteration. Again, after ultracentrifugation, the nanomaterials are expected to settle into multiple bands or separation fractions, where the separation fractions resulting from the second DGU process can have higher monodispersity in thickness compared to the separation fraction(s) resulting from the first DGU process.

The selectivity of the fraction(s) collected can be confirmed by various analytical methods including optical absorbance, Raman spectroscopy, transmission emission spectroscopy (TEM), fluorescence spectroscopy, atomic force microscopy, and other methods known in the art.

Nanomaterials provided by the present methods can be highly monodisperse in thickness. For example, the present methods allow production of graphene nanomaterials having a high percentage of monolayer graphene, bilayer graphene, and/or trilayer graphene, and substantially free of few-layer ($n \geq 4$) graphene nanomaterials. In addition, because the present methods generally do not include any thermal or chemical (e.g., oxidative and/or reductive) treatment, nanomaterials provided by the present methods can be considered pristine, that is, they have not been oxidized, reduced, and/or otherwise chemically modified in any way. For example, monolayer graphene provided by the present methods generally is substantially defect-free. Compared to graphene nanomaterials which are prepared from reduction of exfoliated graphite oxide, the present graphene nanomaterials generally have better electronic properties, specifically, in terms of higher electrical conductivity (or lower sheet resistance).

The nanomaterials according to the present teachings can be processed into various composites and devices. For example, the present nanomaterials can be prepared as an aqueous dispersion in composition with sodium cholate and/or other surface active components and processed via various solution-phase techniques known in the art such as spray coating, drop casting, spin coating, dip coating, and printing. In addition, thin films of nanomaterials can be prepared by filtering a nanomaterial dispersion under vacuum (i.e., by vacuum filtration) through a porous membrane as known by those skilled in the art. Films prepared from sorted nanomaterials according to the present teachings can have various desirable properties over those prepared from unsorted nanomaterials. For example, films obtained from graphene nanomaterials having a high percentage of monolayer graphene can exhibit high optical transmittance (e.g., >50%) in a wide transmittance window (from ~300 nm to 3300 nm) and a low sheet resistance (e.g., 5 kΩ/or less). The electrical conductivity of the films can be further improved by annealing the films at relatively low temperature (<300° C.), reducing the sheet resistance to about 2 kΩ/or less, for example, about 1.5 kΩ/with a transmittance of about 65% in the visible range. By comparison, films produced from polydisperse graphene/graphite nanomaterials using conventional sedimentation-based centrifugation techniques typically exhibit a sheet resistance of greater than or about 10 kΩ/with a transmittance of about 60% in the visible range.

As discussed above, the present invention can be directed to the sorting of two-dimensional transition metal dichalcogenides (TMDs). Without limitation, representative of such embodiments, consider the following. Molybdenum disulfide ($MoS_2$), one of the TMDs, has been studied with great interest for a wide range of applications due to its unique electronic, optical, and catalytic properties. The bulk $MoS_2$ crystal is a semiconductor with a 1.2 eV indirect bandgap and consists of covalently bonded S—Mo—S stoichiometric layers that interact with neighboring layers via the relatively weak van der Waals interaction. When isolated as a single stoichiometric layer, $MoS_2$ shows strong visible photoluminescence due to the emergence of a 1.9 eV direct bandgap at the K point of the hexagonal Brillouin zone. In order to fully understand and exploit the unique properties of single-layered $MoS_2$, many production methods have been developed including micromechanical, chemical, and surfactant-assisted liquid-phase exfoliation, in addition to growth via chemical vapor deposition. While the micromechanical cleavage technique produces single- or few-layered $MoS_2$ with high structural quality, this method lacks sufficient scalability for practical applications. On the other hand, solution-phase exfoliation of single-layered $MoS_2$ can be achieved by lithium intercalation, although this process drives a phase transition to the metallic $1T-MoS_2$ structure, thus necessitating subsequent thermal treatments in an attempt to recover the semiconducting $2H-MoS_2$ phase. However, complete semiconducting phase recovery has not yet been demonstrated, and the presence of the residual metallic phase can have detrimental effects, especially in electronic applications. Alternative liquid exfoliation methods can avoid the metallic $1T-MoS_2$ phase transition, but typically yield a range of $MoS_2$ flake thicknesses. Lastly, ultrathin $MoS_2$ growth by chemical vapor deposition requires high temperature processing and subsequent transfer from the growth substrate, which is arguably more cumbersome than solution-based approaches.

Furthermore, as discussed above, the present invention provides an alternative solution-based route for preparing structurally pristine, ultrathin $MoS_2$ nanosheets via isopycnic density gradient ultracentrifugation (DGU). To more specifically assess the applicability of DGU to $MoS_2$ nanosheets, the following geometrical buoyant density model was used for SC-encapsulated $MoS_2$:

$$\rho(N) = \frac{\rho_S N + 2 m_{surf} \sigma + 2\rho_{H_2O} t_H}{(N+1) t_{MoS_2} + 2 t_A + 2 t_H}$$

where $\rho_s = 3.39 \times 10^{-7}$ g cm$^{-2}$ is the sheet density of $MoS_2$, N is the number of the $MoS_2$ sheets, msurf=$7.15 \times 10^{-22}$ g is the mass of one SC molecule, $\sigma = 1.35$ nm$^{-2}$ is the surface packing density of SC on $MoS_2$, $\rho_{H2O}$ is the density of water, $t_H = 3.3$ nm is the assumed hydration shell thickness, $t_{MoS2} = 0.67$ nm is the $MoS_2$ interlayer distance, and $t_A = 0.355$ nm is the assumed anhydrous shell thickness. The values for $\sigma$, $t_H$, and $t_A$ are based on previously established values for SC-encapsulated graphene. The resulting buoyant densities are presented in FIG. 7C, where SC-encapsulated $MoS_2$, even in the monolayer limit, is predicted to be more dense than iodixanol, the density gradient medium, at its solubility limit (1.32 g cm$^{-3}$). Evidently, the relatively large sheet density of $MoS_2$ compared to graphene implies that the hydration of SC is insufficient to lower the buoyant density of suspended $MoS_2$ nanosheets to a level compatible with isopycnic DGU.

To overcome this issue, an alternative dispersant was considered for $MoS_2$ that would enable greater hydration and thus lower buoyant density in aqueous solution. A nonionic, biocompatible, amphiphilic Pluronic® block copolymer was selected due to its relatively large molecular weight and long hydrophilic chains for effective steric hindrance. Representative of numerous such commercially available Pluronic® copolymers, Pluronic F68 was employed. In particular, F68 is composed of a central hydrophobic polypropylene oxide (PPO) unit surrounding by hydrophilic polyethylene oxide (PEO) chains (FIG. 7A). To estimate the buoyant density of F68-encapsulated $MoS_2$, the parameters in the aforementioned model are modified as following: $m_{surf} = 1.40 \times 10^{-20}$ g is the mass of one F68 molecule, $t_A = 1.6$ nm, $t_H = 20.6$ nm, and $\sigma$ is varied between 0.058 nm$^{-2}$ and 0.575 nm$^{-2}$ to account for the two likely extremes where the surface coverage of PPO chains on the $MoS_2$ surface ranges from 10% to 100%. This model suggests that the buoyant density of F68-$MoS_2$ is substantially reduced compared to SC—$MoS_2$ and likely to fall within the achievable range of iodixanol-based density gradients, especially in the limit of ultrathin $MoS_2$ (FIG. 7C).

To assess the effectiveness of F68-$MoS_2$ for DGU, 1 g of $MoS_2$ powder was first exfoliated and dispersed in 2% weight per volume (w v$^{-1}$) aqueous solution of F68 via tip ultrasonication. After ultrasonication, it was found that 17.1% of the initial $MoS_2$ mass was dispersed, as determined by measuring the mass of the undispersed residual $MoS_2$ slurry. The resulting F68-$MoS_2$ dispersion was placed in a step density gradient and ultracentrifuged at 32 krpm for 24 hours to remove thick $MoS_2$ flakes and enhance the population of thin $MoS_2$ nanosheets (FIG. 8A). After this concentration step, 0.027 mg of $MoS_2$ flakes with thickness below 5 nm remain, of which 24% are single-layer $MoS_2$ flakes as determined by AFM. This level of exfoliation is comparable to previous literature results, and may be improved with the development of emerging techniques such as shear mixing or ball milling. After ultracentrifugation, dense iodixanol solution containing 2% w v$^{-1}$ F68 was injected above the sedimented aggregates at the bottom of ultracentrifuge tube to separate and allow fractionation of the concentrated $MoS_2$ nanosheets. The extracted F68-$MoS_2$ dispersion was stable for several months. It was observed that when concentrated $MoS_2$ nanosheets were prepared using SC as the surfactant, there was no isolation of a SC—$MoS_2$ band, which further illustrates the effectiveness of F68 as a dispersant for $MoS_2$.

After the concentration step, the fractionated F68-$MoS_2$ solution was placed at the bottom of a linear density gradient and ultracentrifuged at 28 krpm for 12 hours. The first iteration of DGU induces the F68-$MoS_2$ nanosheets to separate into multiple visible bands throughout the ultracentrifuge tube (FIG. 8B). These bands were recovered in 1 mm steps using a piston gradient fractionator and labeled with their position (i.e., fractions were recovered starting from 6 mm above the first band and thus f7 indicates the fraction that encompasses the first band). For further refinement, three fractions from the most well-defined bands (f7, f17, and f27) and relatively wider bands (f9, f13, and f23) were extracted, and then placed at the top of a linear density gradient. The second iteration of DGU was performed at 41 krpm for 12 hours, leading to the formation of well-defined $MoS_2$ bands at their corresponding isopycnic points (dashed regions in FIG. 8C), which were then fractionated for characterization. The topmost band, which will later be shown to be highly enriched in single-layer $MoS_2$, possesses a mass of 0.002 mg, which implies that DGU captures 30.8% of the exfoliated single-layer $MoS_2$ flakes (See, below, for more details on the calculation of the DGU yield). It should be noted that similar DGU results were achieved for other TMDs (e.g., DGU of $WS_2$, $MoSe_2$, and $WSe_2$, etc.), thus demonstrating the generality of the copolymer-assisted DGU for thickness sorting of two-dimensional nanomaterials.

High angle annular dark field scanning transmission electron microscopy (HAADF-STEM) was used to verify the 2H structural phase and characterize atomic-level defects of the $MoS_2$ nanosheets. FIG. 9A shows a schematic illustration of the 2H structural phase with trigonal prismatic coordination. A Fast Fourier Transform from the HAADF-STEM image with two direction index is shown in FIG. 9B. FIGS. 9C and 9D show high resolution HAADF-STEM images of $MoS_2$ nanosheets before and after DGU. The inset in FIG. 9D shows the magnified STEM image with the position of Mo (blue) and S (brown) atoms. These STEM images reveal that the pristine 2H semiconducting structure of $MoS_2$ is preserved with minimal surface or edge defects following DGU processing.

Figure 10A:
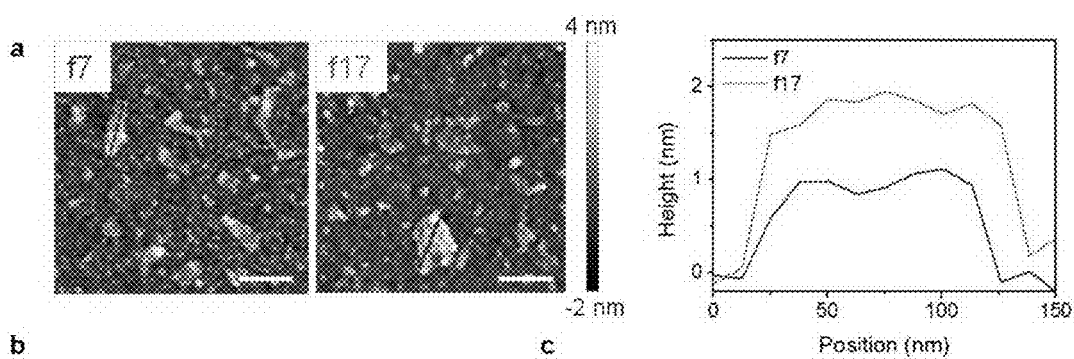
Figure 10A:
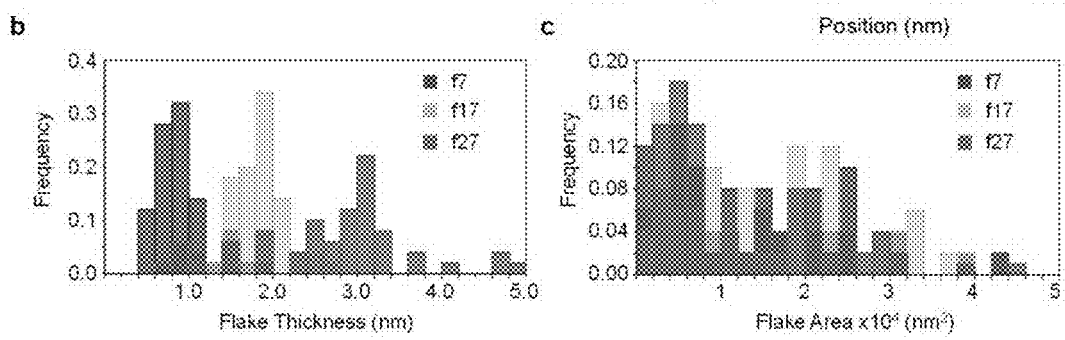

Atomic force microscopy (AFM) was used to characterize the thickness and size of the sorted $MoS_2$ nanosheets. AFM images (FIG. 10A) indicate that the most buoyant fraction (f7) contains predominantly monolayers, while the less buoyant fraction (f17) primarily consists of $MoS_2$ multilayers. From the line profile, a monolayer $MoS_2$ flake in f7 has ~1 nm thickness. This measured thickness is slightly larger than previously reported values, which is reasonable due to the presence of residual F68. FIGS. 10B and 10C show the AFM-measured thickness and area histograms for $MoS_2$ nanosheets from the f7, f17, and f27 fractions. These histograms were obtained from greater than 100 individual $MoS_2$ flakes from each fraction. The average flake thicknesses for fractions f7, f17, and f27 are 1.02, 1.84, and 2.52 nm, respectively, thus demonstrating effective thickness sorting by DGU. In contrast, the flake area histograms show significant overlap, which is consistent with the buoyant density of two-dimensional nanomaterials being independent of lateral area. Overall, it is evident that the $MoS_2$ DGU separation is driven by thickness instead of the lateral size with ~86% of the $MoS_2$ nanosheets from f7 having a thickness less than 1.2 nm, which corresponds to single layers of $MoS_2$.

Figure 11A:
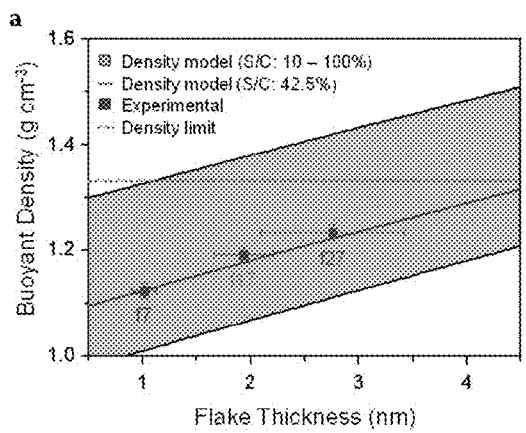
FIGS. 11A-D. Buoyant density analysis and optical properties. (A) Experimental data (squares) are plotted with the buoyant density model using a surface coverage variation from 10% to 100% (black lines). The surface coverage of F68 on the $MoS_2$ surface determined from the experimental data, which corresponds to approximately 42.5%, is also shown. (B) Optical absorbance spectra of fractions f7, f17, and f27, and the $MoS_2$ dispersion before separation. (C) Raman spectra of each fraction showing the shifts in the in-plane and out-of-plane vibrational modes as a function of $MoS_2$ thickness. (D) Photoluminescence spectra of fraction f7 compared to a micromechanically exfoliated monolayer $MoS_2$.

Based on the measured thickness and buoyant density values, the $MoS_2$ experimental data are plotted with the geometrical buoyant density model in FIG. 11A. The experimental values imply a Pluronic F68 packing density $\sigma$ of 0.244 $nm^{-2}$. Since the PPO chain of Pluronic F68 occupies an area of approximately 1.74 $nm^2$ on the $MoS_2$ surface, this packing density corresponds to ~42.5% surface coverage of Pluronic F68. The surface coverage of F68 for $WS_2$, $MoSe_2$, and $WSe_2$ are determined to be 61.4%, 68.2% and 57.0%, respectively.

These experimentally determined surface coverage correlate with the relative hydrophobicity of each TMD. In particular, the most hydrophilic $MoS_2$ surface shows the lowest F68 surface coverage, which is consistent with expectations since F68 interacts with the TMD surface via its hydrophobic PPO chains.

Figure 11B:
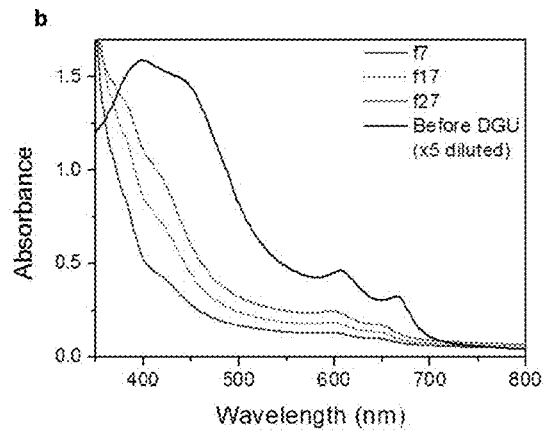

Following DGU, optical absorbance spectra for fractions f7, f17, and f27 in addition to the $MoS_2$ dispersion before separation were measured (FIG. 11B). The direct $MoS_2$ excitonic transition peaks at ~610 and ~660 nm are present in all of the samples after DGU, further confirming that the original 2H—$MoS_2$ crystal structure was maintained through the separation process. The two absorption peaks between 600 and 700 nm are attributed to the excitonic peaks of $MoS_2$. The weaker optical intensity of these peaks from f7, f17, and f27 are due to the relatively small concentration of $MoS_2$ in the solution following DGU. In addition, the blue shift observed in these peaks is consistent with the smaller lateral flake size following DGU, and the strong absorption below 400 nm is attributed to the density gradient medium (i.e., iodixanol).

Figure 11C:
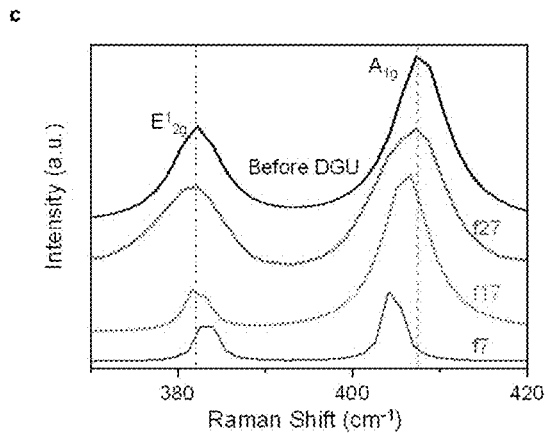

Each $MoS_2$ fraction was also characterized by Raman spectroscopy (FIG. 11C). In this case, $MoS_2$ films were prepared by vacuum filtration and transferred onto a $SiO_2$ substrate at which point Raman spectra were obtained using a beam size of ~1 μm and an excitation wavelength of 514 nm. The Raman spectra from the unsorted $MoS_2$ sample and fraction f27 show two peaks, specifically the in-plane $E^1_{2g}$ mode at ~382 $cm^{-1}$ and the out-of-plane $A_{1g}$ mode at ~407 $cm^{-1}$, which are comparable to those of bulk $MoS_2$. As the number of layers decreases, the $E^1_{2g}$ mode is stiffened and the $A_{1g}$ mode is softened, such that the peaks from fraction f7 are shifted to ~384 $cm^{-1}$ and ~404 $cm^{-1}$, respectively. Additionally, the width of these two peaks is reduced in the more buoyant fractions, which confirms that the flake thickness homogeneity is improved by DGU.

Figure 11D:
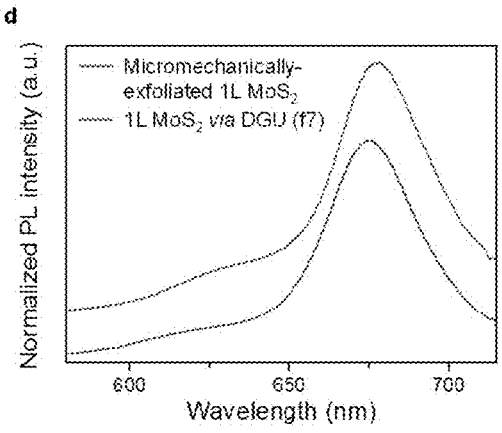
Figure 12:
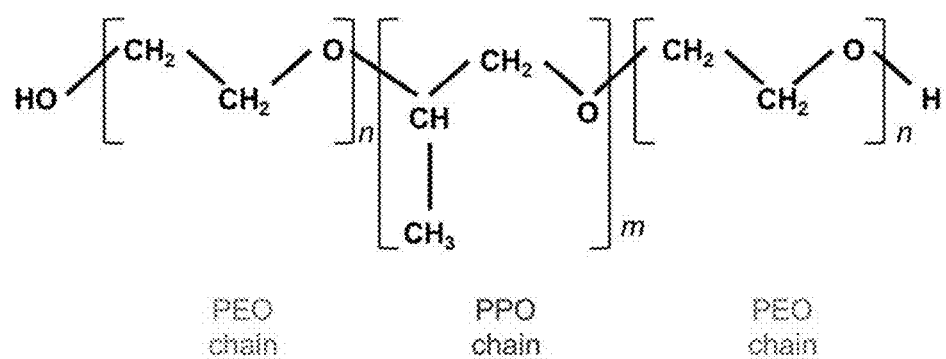
FIG. 12. Chemical structure of Pluronic F68 showing its hydrophilic PEO and hydrophobic PPO chains. Pluronic F68, a block copolymer dispersant composed of a central hydrophobic PPO unit flanked by hydrophilic PEO chains.

To further verify the isolation of $MoS_2$ monolayers, photoluminescence spectroscopy was performed on fraction f7 using an excitation wavelength of 514 nm (FIG. 11D). For comparison, a photoluminescence spectrum was obtained under identical measurement conditions from a micromechanically exfoliated monolayer of $MoS_2$, and both spectra were normalized using their Raman spectra. The photoluminescence spectra from each fraction show two peaks with comparable intensities at ~610 and ~660 nm that are well correlated with the $MoS_2$ excitonic transitions. $WS_2$ nanosheets were similarly characterized following DGU, where photoluminescence was also observed from the most buoyant fractions.

As demonstrated, isopycnic DGU enables solution-phase preparation of controlled thickness TMDs. Specifically, the amphiphilic block copolymer Pluronic F68 increases the hydration and thus reduces the effective buoyant density of TMDs into the range of standard density gradient media. Thickness sorting of TMDs is confirmed with AFM and Raman spectroscopy, resulting in the emergence of photoluminescence from the most buoyant single-layered nanosheets. Furthermore, atomic-resolution STEM imaging verifies that the resulting thickness-sorted TMDs possess high crystal quality with low surface and edge defect density. Since DGU has proven industrial scalability, this approach holds promise for the solution-phase production of monolayered TMDs in emerging large-volume applications including photovoltaics, catalysis, biotechnology, and electronics.

The present teachings also encompass articles of manufacture such as various electronic devices, optical devices, and optoelectronic devices that incorporate one or more transparent and electrically conductive components. Instead of using existing transparent and electrically conductive materials such as indium tin oxide, graphene films according to the present teachings can be used as transparent conductors. For example, sensors for detecting chemical or biological species can be fabricated where the graphene film forms one of the conducting channels. Solar cells, light emitting diodes, and plasma and liquid crystal displays also can be fabricated based on graphene films according to the present teachings. The present graphene films can confer new advantages to the devices described above such as mechanical flexibility and/or longer lifetime.

EXAMPLES OF THE INVENTION

The following examples are provided to illustrate further and to facilitate the understanding of the present teachings and are not in any way intended to limit the invention.

Example 1

Solution Phase Preparation of Graphene. Graphene nanomaterial dispersions were prepared by horn ultrasonication of naturally occurring graphite flakes in an aqueous solution containing a surface active component. More specifically, six grams of natural graphite flakes (3061 grade material from Asbury Graphite Mills, Asbury, N.J., USA) were added to 70 mL of a 2% w/v sodium cholate (SC) aqueous solution inside a ~120 mL stainless steel beaker. This mixture was chilled in an ice water bath and ultrasonicated using a Fisher Scientific Model 500 Sonic Dismembrator with a 13-mm-diameter tip for one hour at a power level of 51-52 W. Large initial loadings of graphite were chosen to maximize the concentrations of graphene exfoliated into the SC solution given the low cost of graphite flakes (~$0.02 per gram). The sonicated graphene nanomaterial dispersions appeared as a gray-black slurry, suggesting the presence of both thin graphene nanosheets and thicker graphite flakes.

Example 2

Sedimentation Centrifugation. Sedimentation centrifugation was performed to remove the fast sedimenting thick graphite materials from the sonicated graphene nanomaterial dispersions from Example 1. Specifically, the graphene nanomaterial dispersions were centrifuged in filled 2 mL eppendorf tubes using a tabletop centrifuge (Eppendorf Model 5424 Microcentrifuge) using four different conditions summarized in Table 1. The black supernatant resulting from the sedimentation centrifugation processing was believed to consist of predominantly few-layer graphene nanoflakes. The sedimented graphene nanomaterial dispersions were observed to be stable for several weeks at loadings in excess of 90 µg/mL. After centrifugation, the top 1 mL layer of the dispersion was decanted carefully from each eppendorf tube. Optical absorbance measurements were taken with a Cary 500 spectrophotometer (Varian) to estimate the concentration of graphene nanomaterials in the dispersions using an average absorption coefficient for graphene of 2,460 mL$^{-1}$ m$^{-1}$ at a wavelength of 660 nm. Contributions from the optical cuvette and sodium cholate solution were subtracted from the spectra of the graphene dispersions. Table 1 lists the concentration of graphene nanomaterials in the sedimented dispersions as determined from the absorbance measurements.

TABLE 1

| Sedimentation Processing Parameters | | | |
|---|---|---|---|
| Centrifugation Time (min) | Centrifugation Speed (rpm) | Relative (speed)$^2$(time) | Graphene Concentration (mg mL$^{-1}$) |
| 10 | 750 | 1 | 0.25 |
| 5 | 5000 | 22.2 | 0.23 |
| 5 | 15000 | 200 | 0.20 |
| 60 | 15000 | 2400 | 0.09 |

Example 3

Concentration of Graphene Dispersions by Ultracentrifugation in a Step Gradient. To obtain concentrated dispersions of graphene nanoflakes, the sedimented dispersions from Example 2 were centrifuged in a step density gradient. Specifically, the step gradients were prepared from a dense 6 mL underlayer containing about 60% w/v iodixanol (density of about 1.32 g mL$^{-1}$) and about 2% w/v SC, followed by a graphene overlayer of ~32 mL (density of about 1.0 g mL$^{-1}$) added carefully on top, and ultracentrifuged in an SW 28 rotor (Beckman Coulter) for 24 hours at 28 krpm and a temperature of 22° C. Ultracentrifugation of the step gradients caused the graphene nanosheets to sediment rapidly to the point where the density of the medium changed discontinuously. In this region, the few-layer graphene nanoflakes with low buoyant densities halted their sedimentation as they reached their isopycnic points while the denser thick graphite flakes continued their motion until they eventually form a pellet at the bottom of the centrifuge tube. This step gradient approach thereby eliminated a large portion of the thick components in the dispersion without removing valuable few-layer nanomaterials that also could be eliminated by simple centrifugation without the use of a dense underlayer. Following ultracentrifugation, a 60% w/v iodixanol, 2% w/v SC displacement layer was slowly infused near the band of concentrated graphene nanomaterials to both separate it from the dense material below and to raise the position of the band in the centrifuge tube for more reliable fractionation. The concentrated nanomaterials was then collected near the step in the gradient using a piston gradient fractionator (Biocomp Instruments) to provide a highly concentrated graphene nanomaterial dispersion.

Example 4

Separation of Few-Layer Graphene Materials by Thicknesses Using Density Gradient Ultracentrifugation. To separate the few-layer graphene nanomaterials by their thicknesses, the concentrated graphene nanomaterial dispersion collected from Example 3 was subjected to two iterations of density gradient ultracentrifugation (DGU). The relevant DGU conditions used for the first and second iteration separations are summarized in Table 2. The first iteration used the maximum volume of concentrated graphene nanomaterial dispersion that could be added to a 4 mL solution with a density of 46% w/v iodixanol. For the second DGU iteration, the graphene nanomaterial dispersions were diluted to 9-16% w/v iodixanol to decrease viscosity, increase the graphene sedimentation rate, and enable layering on the top of the density gradient.

Figure 1C:
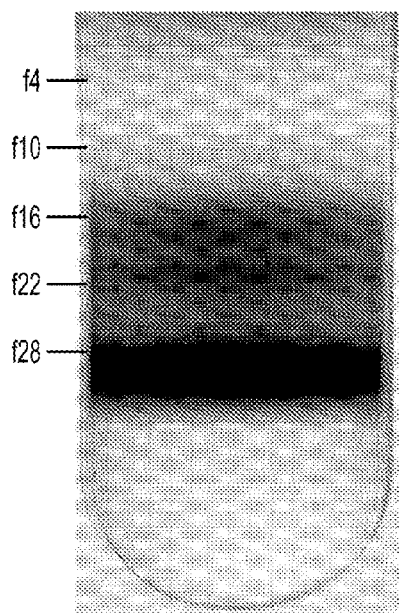
FIG. 1C is a photograph showing a centrifuge tube containing graphene nanomaterials after one iteration of density gradient ultracentrifugation (DGU) according to the present methods. The concentrated graphene was diluted by a factor of 40 to ensure that all graphene bands could be clearly resolved in the photograph. Lines mark the positions at which sorted graphene fractions f4, f10, f16, f22, and f28 were extracted within the centrifuge tube.

More specifically, in the first iteration, the concentrated graphene dispersion was injected at the bottom of the linear density gradient and centrifuged for 24 hours at a maximum centripetal acceleration of 141,000 g. During this process, the graphene nanosheets moved upwards in the centrifuge tube to their isopycnic points. FIG. 1C is a photograph of the centrifuge tube following the separation. Multiple gray bands at different locations inside the gradient were observed. These bands were recovered in 1 mm steps using a piston gradient fractionator. Of the resulting 32 fractions, five were selected for a second iteration of DGU: fractions f4, f10, and f22, which corresponded to the thinnest bands observed; and fractions f16 and f28, which were part of broader bands. To achieve further density gradient refinement, the graphene nanomaterial dispersion was loaded at the top of a second density gradient forcing the graphene flakes to move downward in the centrifuge tube to their respective isopycnic points. This second DGU iteration removed slow moving, low buoyant density materials that did not reach their isopycnic points in the first iteration.

TABLE 2 conditions used for DGU Separations

|  | First DGU Iteration | Second DGU Iteration |
|---|---|---|
| Overlayer | ~13 mL, 0% w/v iodixanol | 0 to 2 mL, 0% w/v iodixanol |
| Graphene Layer | 4 mL, 46% w/v iodixanol, concentrated graphene dispersion | 3 to 5.5 mL, between 9 to 16% w/v iodixanol (homogeneous density) |
| Linear Density Gradient | 15 mL, 25% to 45% w/v iodixanol | 5 mL, 30% to 50% w/v iodixanol |
| Underlayer | 6 mL, 60% w/v iodixanol | 1.5 mL, 60% w/v iodixanol |
| Rotor | SW 28 | SW 4l Ti |
| Centrifugation Parameters | 28 krpm for 24 hours at 22° C. | 41 krpm for 12 hours at 22° C. |

Example 5

Assessment of Thicknesses of Graphene Nanomaterials by Atomic Force Microscopy and Raman Spectroscopy Example 5.1

Sample Preparation. The DGU-processed graphene nanomaterials were characterized by both atomic force microscopy (AFM) and Raman spectroscopy. Samples were prepared by depositing graphene nanoflakes onto Si wafers capped by a 100-nm thick oxide. Prior to deposition, the wafers were immersed in an 2.5 mM (3-aminopropyl)triethoxysilane aqueous solution to functionalize them with a self-assembled monolayer, dried with a stream of $N_2$, rinsed with water, and then dried again. The graphene nanomaterial dispersion was typically diluted by a factor of five with a 2% w/v sodium dodecyl sulfate aqueous solution to improve the yield of the deposition. A drop of this diluted solution was then applied to the receiving wafer and left for 10 minutes. The drop was blown off the wafer with a stream of $N_2$, followed by rinsing the wafer in water for ~15 seconds, and drying by nitrogen. To remove residual surfactants and iodixanol, the graphene samples were annealed in air for one hour at about 250° C. For better AFM imaging, graphene samples that had undergone density processing were sometimes dialyzed to remove iodixanol. For ~2 mL of graphene dispersion, dialysis was typically done with 20,000 molecular weight cut-off dialysis cassettes (Pierce Slide-A-Lyzer) using a 1.75 L, 2% w/v SC aqueous bath for ~48 hours.

Example 5.2

Atomic Force Microscopy. AFM images were obtained using a Thermo Microscopes Autoprobe CP-Research AFM operating in tapping mode with conical probes (MikroMasch, NSC36/Cr—Au BS). All AFM images used for thickness measurements were generated using one of two AFM probes. To ensure the two probes produced the same thickness values, multiple graphene flakes from fraction f4 were imaged by both probes and compared. In addition, highly-oriented pyrolytic graphite (HOPG) was imaged as a calibration standard for accurate height measurements. All images in the analysis were 2 μm×2 μm and collected under identical scan parameters. Graphene sheets that were part of bundles were excluded from the analysis. In addition, sub-2500 $nm^2$ area flakes were neglected due to the uncertainty in their thickness measurements as were residual SC or iodixanol whose thickness exceeded 5 nm.

Graphene flakes from fraction f4 exhibit an average thickness of about 1.1 nm. Single-layer graphene on $SiO_2$ typically has an apparent thickness of ~1 nm as a result of adsorbed water (see Novoselov et al., Science, 306(5696): 666-669 (2004)). The slightly increased thickness of the materials from fraction f4 could be due to residual sodium cholate molecules on the graphene surface. In contrast, the graphene sheets from f16 were found to have an average thickness of 1.5 nm.

Figure 2A:
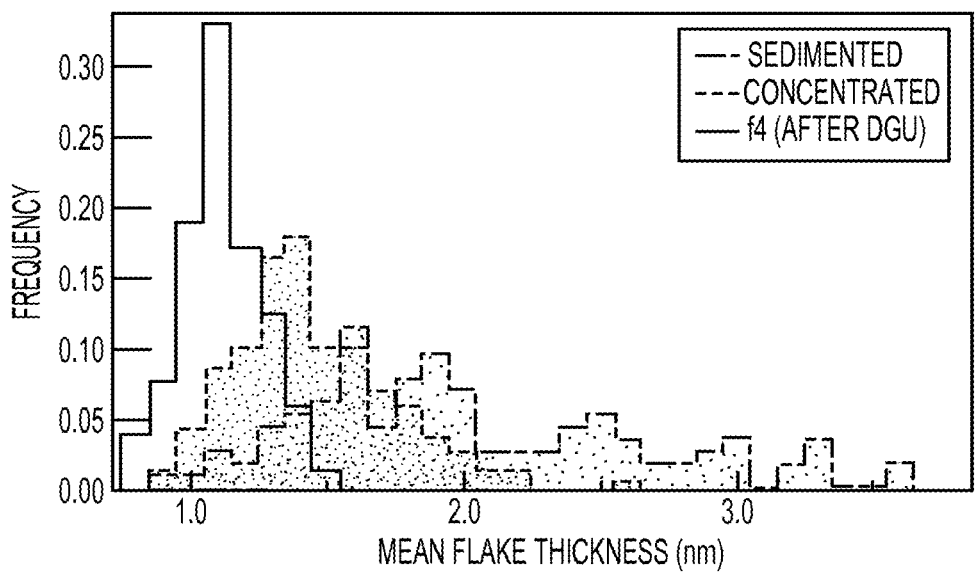
FIG. 2A is a histogram comparing the mean flake thickness (calculated using AFM images) for sedimented, concentrated, and DGU fraction f4 graphene dispersions.
Figure 2B:
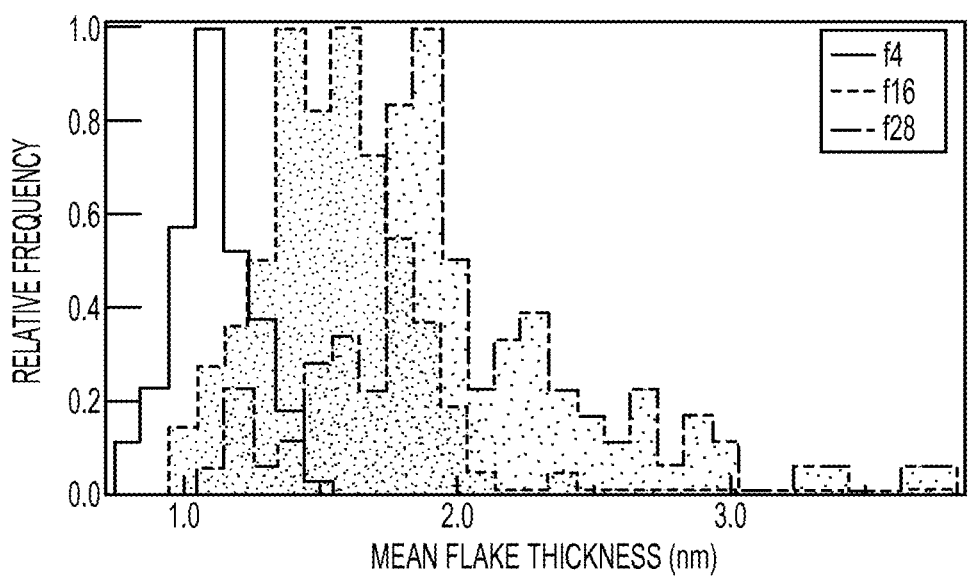
FIG. 2B is a histogram plotted by relative frequency (mode thickness scaled to unity) comparing the mean flake thickness (calculated using AFM images) for DGU fractions f4, f16, and f28.

FIGS. 2A and 2B present the thickness histograms of several sorted graphene fractions (Example 4) as well as the concentrated (Example 3) and sedimented (Example 2) graphene dispersions. These histograms were calculated from at least 100 individual flakes using multiple 2 μm×2 μm AFM images with the average thickness measured over the area of each flake. Comparison of the thickness distributions of the sedimented, concentrated, and f4 graphene solutions in FIG. 2A shows progressive sharpening of the distributions with increasing buoyant density refinement.

With continued reference to FIG. 2A, it can be seen that for the sedimented graphene solution, 37% of the flakes was found to have thicknesses greater than 2 nm. By comparison, following concentration step gradient processing, only 2.6% of the dispersion was found to have thicknesses greater than 2 nm. Furthermore, it can be seen that following DGU, flakes having thicknesses greater than 2 nm essentially are absent in fraction f4. Instead, at least about 80% of the graphene flakes from fraction f4 were found to have thicknesses of 1.2 nm or less, suggesting that most of these graphene flakes likely correspond to single-layer graphene. In contrast, only 24% of the concentrated graphene consisted of single-layer material.

Referring to FIG. 2B, the thickness distributions of the graphene sorted using DGU show a monotonic increase in the average flake thickness with increasing buoyant density. Comparing the mean flake thickness of the graphene materials in fractions f4, f16, and f28 to the sedimented or concentrated dispersion shown in FIG. 2A, it can be seen clearly that the present methods allow separation of two-dimensional nanomaterials by their thicknesses.

Example 5.3

Figure 3A:
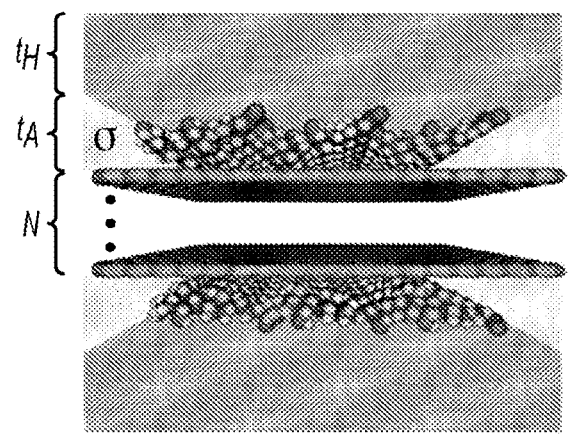
FIG. 3A is a schematic illustration of a buoyant density model for surfactant-encapsulated few-layer graphene nanomaterials in which a flake of thickness N is coated by a surfactant with a packing density $\sigma$ and an effective thickness $t_A$ and a hydration layer of thickness $t_H$.

Geometrical Model for Determining Buoyant Density of Few-Layer Graphene Flakes. Without wishing to be bound by any particular theory, it is believed that upon contact with the appropriate surface active component(s) according to the present teachings, the graphene materials can be dispersed as individual encapsulated flakes, thus providing a graphene dispersion that can remain stable for an extended period of time. To gain further insight into the ordering of surface active components such as sodium cholate on the graphene surface, the inventors developed a geometrical model of the buoyant density of the graphene-SC complex. In this model, and as schematically illustrated in FIG. 3A, the thickness of the graphene sheet is defined by N, which specifies the average number of graphene layers inside the sheet separated by the graphene interlayer distance $t_{gr}$=0.34 nm. On both sides of the graphene sheet is an anhydrous layer of thickness $t_A$ containing the SC encapsulation layer. The SC molecules in this region coat the graphene surface with surface packing density a. Surrounding this SC layer is an electrostatically bound hydration shell of thickness $t_H$. This hydration layer has the lowest density of any of the components in the complex and hence serves to decrease the buoyant density of the graphene-SC assembly. The resulting buoyant density ρ(N) is then:

$$\rho(N) = \frac{\rho_S N + 2 m_{SC} \sigma + 2 \rho_{H_2O} t_H}{(N+1) t_{gr} + 2 t_A + 2 t_H}$$

where $\rho_S$=7.66×10$^{-8}$ g cm$^{-2}$ is the sheet density of graphene, $m_{SC}$=7.15×10$^{-22}$ g is the mass of one SC molecule, and $\rho_{H_2O}$ is the density of water.

Figure 3B:
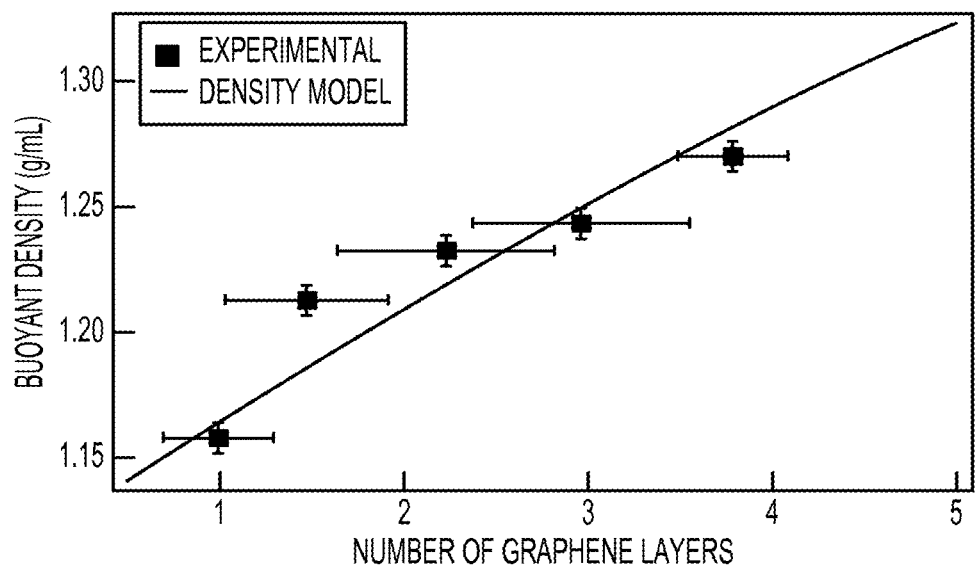
FIG. 3B shows the fit between the buoyant density model and the experimental data. The uncertainty in graphene flake thickness was taken as the full-width at half maximum (FWHM) of the flake thickness distribution.

The graphene buoyant density model was applied to the experimental data by assuming the anhydrous shell thickness $t_A$ was 0.355 nm (see Arnold et al., ACS Nano., 2(11): 2291-2300 (2008)). Furthermore, the apparent thickness for single-layer graphene was taken to be the average thickness of 1.1 nm measured for graphene sheets from fraction f4. N for subsequent fractions was then calculated from their average mean thicknesses and the graphite interlayer spacing. With these conditions in place, the model yields a SC surface packing density σ of 1.35 nm$^{-2}$ and a hydration layer thickness $t_H$ of 3.3 nm. Because SC occupies approximately a ~0.7 nm$^2$ area on the graphene surface (see Arnold et al., ACS Nano., 2(11): 2291-2300 (2008)), this surface density corresponds to ~94% surface coverage of SC (schematically illustrated in FIG. 1B). The small area of graphene occupied by each SC molecule also implies that it is possible for the SC encapsulation layer to accommodate variations in graphene thickness on length scales of several nanometers. Consequently, without wishing to be bound by any particular theory, it is believed that a continuum of mean graphene flake thicknesses can be separated using DGU depending on how the flakes are exfoliated (FIG. 3B).

Example 5.4

Raman Spectroscopy. Raman spectroscopy of graphene flakes on SiO$_2$ was performed using a Renishaw inVia Raman Microscope at an excitation wavelength of 514 nm. To obtain a random sampling of the graphene at multiple locations, spectra were measured at multiple positions spaced at least 5 µm apart. Spectra were obtained using a beam size of 1-2 µm on samples with a high surface coverage of graphene enabling multiple flakes to be probed in a single measurement. For these map scans, 2D, G, and D bands were measured consecutively to ensure the relative intensities of the peaks were not affected by drift of the translation stage.

Figure 4A:
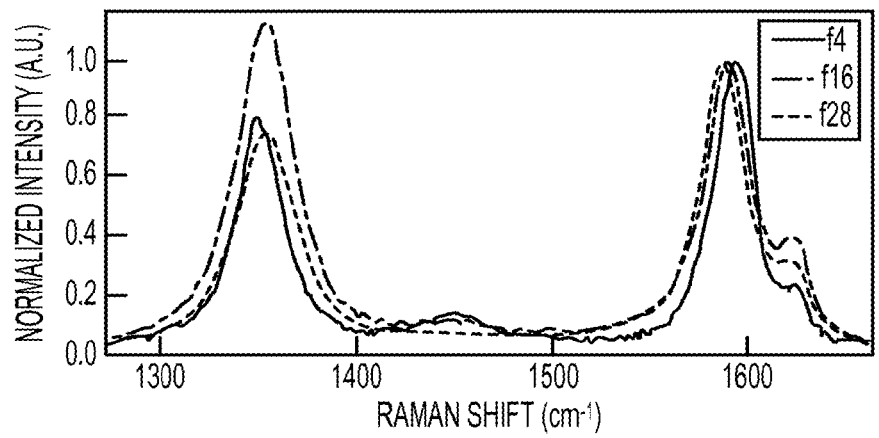
FIG. 4A shows representative Raman spectra of sorted graphene flakes from fractions f4, f16, and f28 on $SiO_2$ in the D and G band region with the intensity of the G band normalized to unity.
Figure 4B:
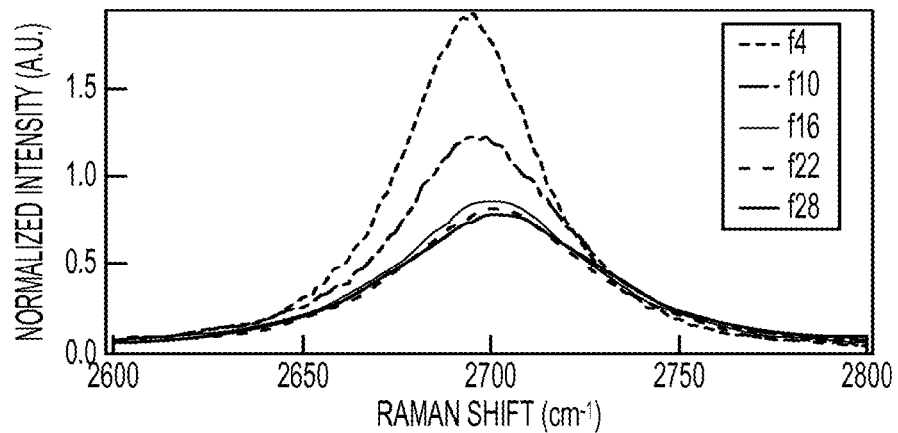
FIG. 4B shows the 2D band of the spectra in FIG. 4A, as well as fractions f10 and f22, with the same G band normalization.
Figure 4C:
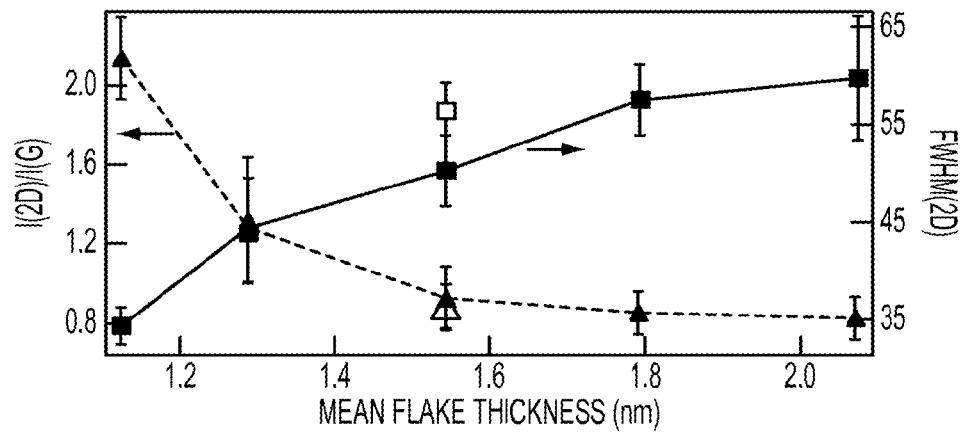
FIG. 4C plots the ratio of 2D and G band intensity I(2D)/I(G) and FWHM(2D) as a function of the mean graphene thickness. Triangles and squares represent I(2D)/I(G) and FWHM(2D), respectively. Open symbols mark values obtained from the concentrated graphene dispersion. Solid symbols mark values obtained from DGU-processed fractions.

Typical Raman spectra from the sorted graphene samples display four main peaks: the G band at ~1590 cm$^{-1}$, the 2D (or G') band at ~2700 cm$^{-1}$, and the disorder-related D and D' peaks at ~1350 cm$^{-1}$ and ~1620 cm$^{-1}$, respectively (FIGS. 4A and 4B). The Raman spectra show systematic changes in the G and 2D peaks as a function of the thickness distribution of the graphene flakes. For example, it can be observed that the 2D peak decreases in intensity and broadens with increasing mean flake thickness. To gather sufficient statistics for these variations, spectra were collected from at least 30 different locations and mean and standard deviation information was extracted from these data. FIG. 4C presents the I(2D)/I(G) ratio and full-width at half maximum (FWHM) of the 2D band as a function of the average thickness of the sorted and concentrated graphene dispersions.

It was observed that as the thickness of the graphene flakes increases, I(2D)/I(G) decreases monotonically from a high of 2.1±0.2 for single-layer graphene to 0.8±0.1 for quadruple-layer graphene. FWHM(2D), on the other hand, increases with graphene thickness nearly doubling between single- and quadruple-layer samples. Similar trends in both I(2D)/I(G) and FWHM(2D) as a function of graphene layer number have previously been observed for CVD grown graphene samples (see Reina et al., Nano. Lett., 9(1): 30-35 (2009)), and should prove useful for more rapid screening of DGU-sorted graphene. Similar to CVD-graphene samples and those grown on SiC (see Faugeras et al., Appl. Phys. Lett., 92(1): 011914-3 (2008)), the 2D band of multilayer graphene appears to be best described by a single Lorentzian lineshape, as opposed to the four component lineshape observed for samples produced by micromechanical cleavage (see Ferrari et al., Phys. Rev. Lett., 97: 187401 (2006)). Because these four components arise from the close interaction between ABAB stacked graphene layers, their absence implies weak interlayer coupling and hence non-ABAB stacking. This source of disorder could be caused during horn ultrasonication or from rebundling of previously exfoliated graphene sheets. The disorder-related D peak is relatively intense compared to the G band in these samples, most likely as a result of defects within the graphene sheets or from the small size of the flakes, which should increase the number of disordered graphene edges probed in the measurement. The ratio of the intensities of the D and G peaks I(D)/I(G) remains fixed at ~0.93 for both the sedimented and density-refined material, which indicates that ultracentrifugation did not contribute additional defects to the graphene. This I(D)/I(G) value is comparable to that observed in highly reduced graphene oxide (see Gao et al. Nature Chem., doi:10.1038/nchem. 281 (2009)), and is less than that measured for lithographically patterned graphene nanoribbons (see Jiao et al., Nature, 458(7240): 877-880 (2009)).

Example 6

Graphene Transparent Conductors

Example 6.1

Preparation of Transparent Conductive Films. To assess the electrical properties of graphene material sorted by the present methods, graphene films were prepared using the method described in Wu et al., Science, 305: 1273 (2004), by filtering approximately 2 mL of graphene dispersion in a 2% w/v SC aqueous solution under vacuum through mixed cellulose ester membranes (Millipore) having a 50 nm average pore size. After the dispersion had passed through the membrane, the film was left to set over 15 minutes. Residual surfactant and iodixanol were rinsed out of the film by filtering through ~30 mL of water. To prevent the film from lifting off the membrane during this step, a protective layer of isopropyl alcohol was slowly added on top of the film followed by a slow but steady stream of the water rinse. The filtered films were then affixed to glass substrates by soaking them in ethanol and pressing the graphene side firmly into the glass. The still wet graphene film and membrane were promptly introduced to an acetone vapor bath that dissolved away the mixed cellulose ester membrane. The membranes were further dissolved in three subsequent acetone liquid baths and a final ethanol liquid bath.

Example 6.2

Figure 5A:
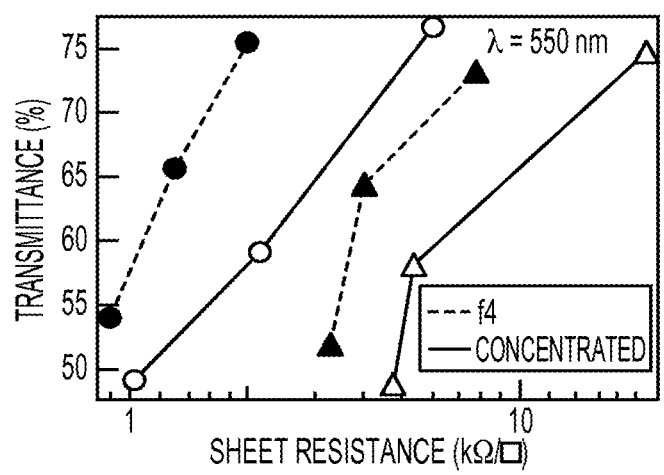
FIG. 5A shows the effect of annealing on the transmittance and sheet resistance of graphene transparent conductors produced from the concentrated and f4 graphene dispersions. Triangles and circles represent the films before and after annealing for two hours at 250° C. in air, respectively. Lines are drawn between points to aid the eye.

Effect of Annealing of Graphene Transparent Conductors. It was found that the sheet resistance of graphene transparent conductive films (Example 6.1) could be decreased by an average factor of 2-4 by annealing them in air. Specifically, film samples were annealed for two hours at about 250° C., which was observed to have the effects of increasing the film conductivity, while increasing the transmittance by about 1%. Without wishing to be bound by any particular theory, it is believed that annealing likely removed some of the iodixanol and sodium cholate remaining in the film and enabled the graphene sheets to reorder to improve flake-flake contacts. The sheet resistance and transmittance of films produced from concentrated graphene and the sorted fraction f4 before and after annealing are shown in FIG. 5A. It was observed that annealing provided greater improvements in sheet resistance for films of higher transmittance. Without wishing to be bound by any particular theory, it is believed that films of high transmittance are closer to the percolation threshold of graphene and are more sensitive to changes in flake network connectivity.

AFM images of the annealed films indicate the graphene flakes form a disordered network. Folded flakes can be discerned in the images along with rough areas that are most likely caused by residual surfactants, iodixanol, or the filter membrane. The films possess high optical transmittance from ~300 nm to 3300 nm, revealing a wide transmittance window that is well suited for infrared applications.

Example 6.3

Figure 5B:
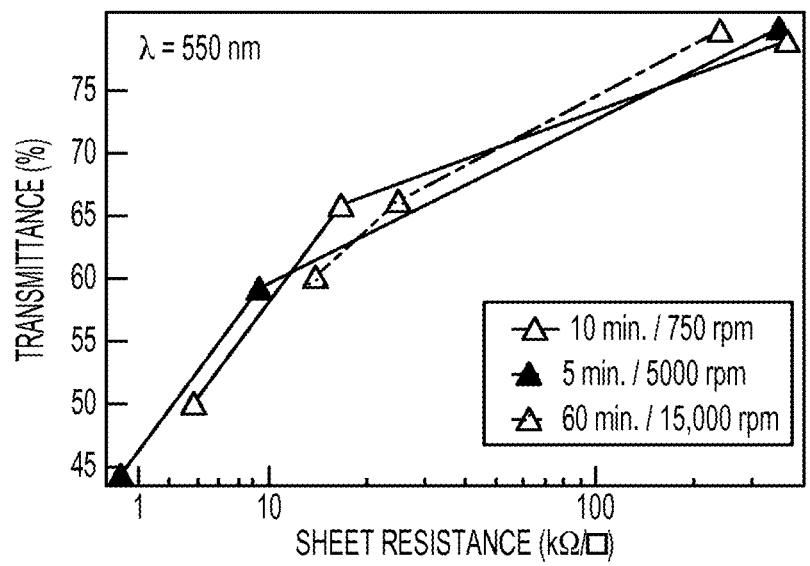
FIG. 5B shows the sheet resistance and transmittance of pristine (not annealed) graphene transparent conductors made from various sedimented dispersions. Lines are drawn between points to aid the eye.

Transparent Conductors Produced from Sedimented Dispersions. To compare between the properties of transparent conductive films prepared from DGU processing and those prepared from sedimented graphene solutions, transparent conductors from sedimented graphene dispersions were prepared under different centrifugation conditions. FIG. 5B presents the sheet resistance and transmittance of films prepared from the graphene dispersions described in Table 1. The variation in the performance of these films is relatively small compared to that observed following density differentiation. This result indicates that any size sorting effect is small for SC-encapsulated graphene produced by this type of sedimentation centrifugation.

Figure 6A:
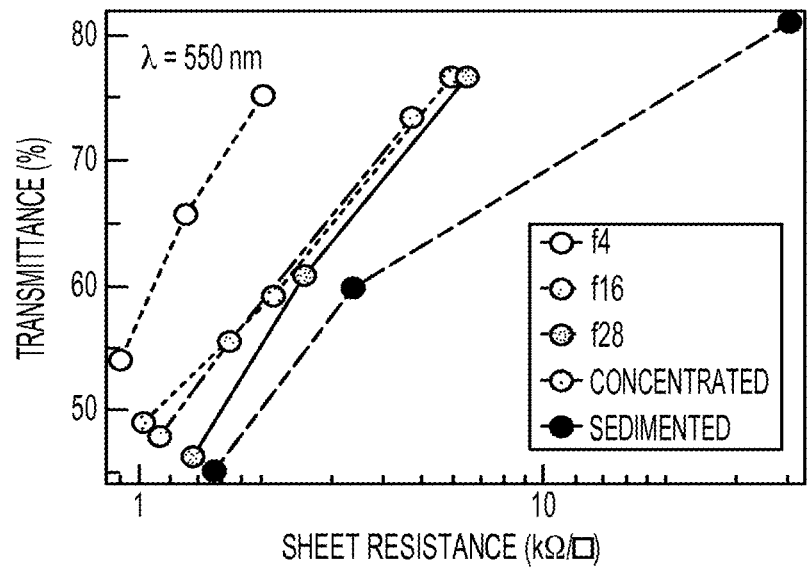
FIG. 6A plots the transmittance of graphene transparent conductors produced from sedimented, concentrated, f4, f16, and f28 dispersions as a function of their sheet resistance at wavelengths of 550 nm. Lines are drawn between points to aid the eye.
Figure 6B:
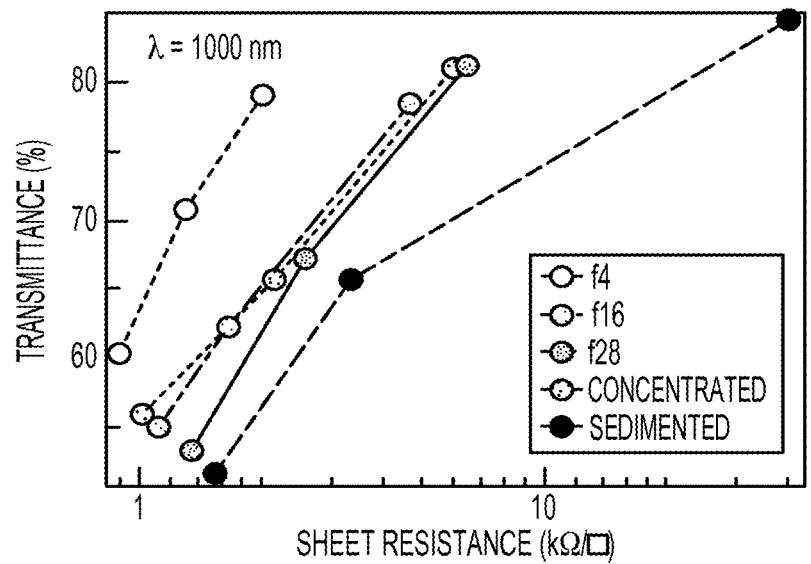
FIG. 6B plots the transmittance of graphene transparent conductors produced from sedimented, concentrated, f4, f16, and f28 dispersions as a function of their sheet resistance at wavelengths of 1000 nm. Lines are drawn between points to aid the eye.

Four-point probe measurements of the film sheet resistance indicated that DGU processing yields significant improvements in the transparent conductive properties of the graphene films. Firstly, all films produced using buoyant density sorting demonstrated improved conductivity compared to films produced from sedimented graphene solutions (FIGS. 6A and 6B). For the films produced from the concentrated, f16, and f28 dispersions, this improvement is ~45%. Secondly, the films produced using predominantly single layer graphene flakes (f4) offer the best transparent conductor performance. These highly refined materials exhibit sheet resistances that are approximately half that of the other density processed material. Analysis of the graphene flakes indicates that the f4 material has the largest mean area (16,000 $nm^2$) of all the materials used for transparent conductors. A large lateral area should result in fewer graphene-graphene contacts required for charge transport across the film and thus implies increased film conductivity. However, the differences in transparent conductor performance between the concentrated and sedimented solutions suggest that the graphene thickness distribution also can play an important role in the connectivity of the graphene network. The larger proportion of thick graphene sheets in the sedimented solution may disrupt the ideal close packed structure of the network, which would reduce the overlap between neighboring sheets. In contrast, the highly flexible single-layer graphene sheets deposited from solution are expected to coat underlying layers with greater conformity, resulting in improved graphene-graphene contacts.

Example 7

Sorting of Non-Graphene Two-Dimensional Nanomaterials by Thickness. Using methods of the present teachings, two-dimensional nanomaterials of controlled thickness can be generated from crystalline materials including, but not limited to, graphite, $MoS_2$, and hexagonal BN. $MoS_2$ is a semiconducting transition metal dichalcogenide consisting of layers of molybdenum coordinated with six sulfide ligands. Hexagonal BN is a semiconductor material with a structure analogous to that of graphite.

Step 1—Dispersion: Base dispersions of the starting crystalline materials typically were generated by loading 10 mL of a 2% w/v SC (Sigma-Aldrich) aqueous solution with one gram of bulk crystallite powder. The mixtures were then subjected to horn ultrasonication at 160 W for one hour using a Fisher Scientific Model 500 Sonic Dismembrator with a tapered microtip probe. Poorly dispersed materials were removed by centrifugation at 21,130 g relative centrifugal force for 5 minutes. The supernatant from each centrifuge tube was recovered to form the base dispersion. The base dispersion of $MoS_2$ was observed to have a yellow/orange color, whereas the base dispersion of BN was iridescent and appeared slightly white. Atomic force microscopy (AFM) images of thin films deposited onto $SiO_2$-capped Si wafers from base dispersions of graphite, $MoS_2$, and hexagonal BN prepared according to the procedures described above confirm the presence of crystallites with thicknesses ranging from about 1 nm to about 10 nm.

Step 2—Concentration in Step Gradient: The base dispersions were then inserted into a step gradient and concentrated. Step gradients were formed by first adding a ~2.5 mL layer of solution of about 1.32 g/mL density consisting of ~2% w/v sodium cholate and ~60% w/v iodixanol to the bottom of the centrifuge tube. A ~9.5 mL layer of the base dispersion was added on top of the underlayer completing the step gradient. The layered centrifuge tubes were ultracentrifuged at 41 krpm in a SW41 Ti (Beckman Coulter) rotor for 14 hours. The concentrated dispersions were recovered using a two-step fractionation process. First, a displacement layer consisting of 2% w/v sodium cholate and 60% w/v iodixanol (OptiPrep; Sigma-Aldrich; 1.32 g/mL density) was slowly infused just below the band of concentrated material. This solution, mixing relatively little with the surrounding liquid, migrated to the position in the step gradient that matched its density and displaced upwards all crystallites with buoyant densities less than 1.32 g/mL. Following upward displacement, the thin band of concentrated two-dimensional nanomaterials was recovered using a piston gradient fractionator (Biocomp Instruments).

Step 3—Sorting in Density Gradient: The crystallite dispersions were added to density gradients loaded with 2% w/v sodium cholate throughout. To generate the density gradients, a 1.5 mL underlayer consisting of 60% w/v iodixanol was added first to the bottom of the centrifuge tube and a 5 mL linear gradient with density varying from about 20% to about 45% w/v iodixanol was formed above. The dispersion of crystallites with iodixanol content adjusted to about 40.8% w/v was then slowly infused into the lower portion of the gradient to a volume of 0.88 mL. Then, the remaining volume of the centrifuge tube was filled with 2% w/v sodium cholate aqueous solution to prevent tube collapse under high centrifugal forces. The centrifuge tubes were spun at 41 krpm for 14 hours in a SW41 Ti (Beckman Coulter). Following centrifugation, the separated two-dimensional nanomaterials were collected using a piston gradient fractionator.

Following ultracentrifugation of concentrated dispersions of graphite, $MoS_2$, and hexagonal BN, discrete bands of material were observed inside the centrifuge tube for all three materials. For graphite crystallites, gray bands of spatially separated material were observed under multiple density gradient conditions. For the $MoS_2$ crystallites, a single isolated yellow band was detected following DGU with denser material forming a broader yellow region nearer the bottom of the centrifuge tube. For BN samples, crystallites were difficult to detect directly by eye since hexagonal BN is a large band gap semiconductor and hence is transparent in the visible portion of the electromagnetic spectrum. However, by recording the light scattered by the crystallites inside the centrifuge tube, it was possible to observe a discrete band of buoyant material isolated from a broad band of much higher density.

The formation of discrete bands of two-dimensional nanomaterials following DGU provides strong evidence for sorting by number of atomic layers. The buoyant density of the crystallite-surfactant complex is most strongly affected by the atomic structure of the two-dimensional nanomaterial. Hence, the existence of crystallites with distinct buoyant densities implies that these crystallites differ by characteristics that vary discretely. As a result, and without wishing to be bound by any theory, it is believed that the crystallites having different buoyant densities consist of different numbers of atomic layers.

Example 8

Preparation of Graphene Nanoribbons. Graphene nanoribbons (GNRs) were obtained from highly oriented pyrolytic graphite (HOPG) dispersed in sodium cholate solution. HOPG flakes were initially added to a 1% w/v sodium cholate aqueous solution at a 1 mg/mL loading and horn ultrasonicated for 3 hours at 200 W. The resulting dispersion was then concentrated in a step gradient as described in Examples 3 and 7 and fractionated using a piston gradient fractionation system without infusing a displacement layer. Subsequently, the concentrated dispersion was incorporated into a density gradient similar to that described in Example 7 except with 1) a linear gradient varying from 20% to 50% w/v iodixanol, 2) an initial graphene layer density of 45% w/v iodixanol, and 3) a loading of 1% w/v sodium cholate throughout the gradient. The layered centrifuge tube was then ultracentrifuged in a SW41 Ti rotor at 41 krpm for 20 hours. Following centrifugation, the separated GNRs were collected using a piston gradient fractionator.

AFM analysis of the separated GNRs reveal that the GNRs have widths below about 10 nm and lengths up to about 1 µm. Typical thicknesses range from about 0.8 nm to about 1.8 nm.

Example 9

Dispersion of Graphene Using Various Surface Active Components. Graphene suspensions were prepared in a variety of surface active components to determine their efficiency at stably encapsulating graphene in aqueous solutions. All graphene dispersions listed below were prepared in an identical manner. Natural graphite flakes (3061 grade material from Asbury Graphite Mills) weighing 600 mg±5 mg were added to 8 mL of an aqueous solution containing a loading of the surface active component of 1% weight per volume. The mixture was horn ultrasonicated (Fisher Scientific Model 500 Sonic Dismembrator equipped with a 3-mm-diameter tip) at a power level of 16-18 W for 30 minutes in a cooling bath of water. Following ultrasonication, the graphite/graphene slurry was centrifuged (Eppendorf Model 5424 Microcentrifuge) in 1.5 mL plastic tubes for 5 minutes at 15 krpm (21, 130×g). The top 1 mL of solution containing few-layer graphene nanomaterials was carefully decanted. The concentration of graphene in each of the suspensions was determined using optical absorption measurements. An extinction coefficient of 2460 $mL^{-1}$ $cm^{-1}$ at a wavelength of 660 nm previously reported for graphene was used for all measurements (see Y. Hernandez et al, *Nature Nanotech.* 3, 563 (2009)).

TABLE 3

Graphene Dispersion Efficiency of Bile Salt Surfactants

| Bile Sale | Graphene Concentration (mg/mL) |
| --- | --- |
| Sodium cholate | 0.54 |
| Sodium deoxycholate | 0.34 |
| Sodium taurodeoxycholate | 0.29 |

TABLE 4

Graphene Dispersion Efficiency of Anionic Surfactants

| Anionic Surfactant | Graphene Concentration (mg/mL) |
| --- | --- |
| Sodium decyl sulfate | 0.11 |
| Sodium undecyl sulfate | 0.14 |
| Sodium dodecyl sulfate | 0.16 |
| Lithium dodecyl sulfate | 0.15 |
| Sodium dodecylbenzenesulfonic acid | 0.33 |

TABLE 5

Graphene Dispersion Efficiency of Cationic Surfactants

| Cationic Surfactant | Graphene Concentration (mg/mL) |
| --- | --- |
| Dodecyltrimethylammonium bromide | 0.16 |
| Myristyltrimethylammonium bromide | 0.19 |
| Hexadecyltrimethylammonium bromide | 0.25 |
| Hexadecyltrimethylammonium chloride | 0.15 |
| Hexadecyltrimethylammonium hydrogen sulfate | 0.12 |

TABLE 6

Graphene Dispersion Efficiency of Polymeric Surfactants

| Polymer | Graphene Concentration (mg/mL) |
| --- | --- |
| Sodium carboxymethylcellulose | 0.55 |
| Tween ® 20 | 0.08 |
| Tween ® 85 | 0.03 |

TABLE 7

Graphene Dispersion Efficiency of Polyvinylpyrrolidone

| Molecular Weight (kDa) | Graphene Concentration (mg/mL) |
|---|---|
| 10 | 0.25 |
| 29 | 0.32 |
| 55 | 0.30 |
| 360 | 0.31 |
| 1300 | 0.28 |

TABLE 8

Graphene Dispersion Efficiency of Pluronic ® Block Copolymers

| Pluronic ® Block Copolymer | Molecular Weight (Da) | PEO Molecular Weight (Da) | PPO Molecular Weight (Da) | Graphene Concentration (mg/mL) |
|---|---|---|---|---|
| F108 | 14600 | 11680 | 2920 | 0.13 |
| F127 | 12600 | 8820 | 3780 | 0.18 |
| F38 | 4700 | 3760 | 940 | 0.17 |
| F68 | 8400 | 6720 | 1680 | 0.20 |
| F77 | 6600 | 4620 | 1980 | 0.27 |
| F87 | 7700 | 5390 | 2310 | 0.19 |
| F88 | 11400 | 9120 | 2280 | 0.18 |
| F98 | 13000 | 10400 | 2600 | 0.18 |
| P103 | 4950 | 1485 | 3465 | 0.07 |
| P104 | 5900 | 2360 | 3540 | 0.12 |
| P123 | 5750 | 1725 | 4025 | 0.06 |
| P84 | 4200 | 1680 | 2520 | 0.12 |

TABLE 9

Graphene Dispersion Efficiency of Tetronic ® Block Copolymers

| Tetronic ® Block Copolymer | Molecular Weight (Da) | PEO Molecular Weight (Da) | PPO Molecular Weight (Da) | Graphene Concentration (mg/mL) |
|---|---|---|---|---|
| 304 | 1650 | 660 | 990 | 0.18 |
| 904 | 6700 | 2680 | 4020 | 0.10 |
| 908 | 25000 | 20000 | 5000 | 0.19 |
| 1107 | 15000 | 10500 | 4500 | 0.24 |
| 1307 | 18000 | 12600 | 5400 | 0.23 |

Example 10.1

Dispersion and Density Gradient Ultracentrifugation. 1 g of MoS$_2$ powder (American Elements) was dispersed in 70 mL of 2% w v$^{-1}$ Pluronic F68 (BASF) aqueous solution via ultrasonication using a 0.125 inch tip in a steel beaker at 25 W for 2 hours. Then, 32 mL of dispersion was carefully added on top of a 6 mL underlayer of 60% w v$^{-1}$ iodixanol and ultracentrifuged at 32 krpm for 24 hours at 22° C. using a SW32 Ti rotor (Beckman-Coulter). Following ultracentrifugation, 3 mL of 60% w v$^{-1}$ iodixanol was injected to separate ~10 mL of concentrated MoS$_2$ nanosheet solution, which was then fractionated using a piston gradient fractionator (BioComp Instruments). For the first iteration, the concentrated MoS$_2$ solution was diluted to contain 46% w v$^{-1}$ iodixanol, and placed under a linear density gradient of 25% to 45% w v$^{-1}$ iodixanol. The linear density gradient was then ultracentrifuged at 28 krpm for 12 hours at 22° C. Following the first iteration, each fraction was diluted to contain 9% w v$^{-1}$ iodixanol and placed on top of a linear density gradient of 30% to 50% w v$^{-1}$ iodixanol for the second iteration. The linear density gradient was then ultracentrifuged in an SW41 Ti rotor (Beckman-Coulter) at 41 krpm for 12 hours. All density gradient and injection solutions contained 2% w v$^{-1}$ F68. (See, Table 10.)

TABLE 10

DGU Conditions for the First and Second Iterations.

| | 1$^{st}$ Iteration | | 2$^{nd}$ Iteration | |
|---|---|---|---|---|
| DGU Condition | Density (w/v) | Volume (mL) | Density (w/v) | Volume (mL) |
| Overlayer | 0% | ~15 | 0% | 2 |
| Linear Density Gradient | 25%-45% | 16 | 30%-50% | 5 |
| MoS$_2$ Layer | 46% | 3.5 | 9% | 3-5 |
| Underlayer | 60% | 6 | 60% | 1.5 |
| Ultracentrifugation Condition | 28k rpm for 12 hours at 22° C. | | 41k rpm 12 hours at 22° C. | |

Example 10.2

Thickness Sorting of Other TMD Nanosheets. Identical conditions were used for thickness sorting of pristine WS$_2$, MoSe$_2$, and WSe$_2$.

Example 11.1

Sample Preparation for Scanning Transmission Electron Microscopy. MoS$_2$ dispersions from each step (after sonication before DGU and after DGU) were collected and placed in 20 k MWCO dialysis cassettes (Thermo Scientific) and dialyzed in 750 mL of 2% w v$^{-1}$ F68 aqueous bath for 24 hours to remove the density gradient medium. To remove the surfactant, MoS$_2$ dispersions were mixed with isopropyl alcohol for 24 hours, filtered through mixed cellulose ester membranes (Millipore, 50 nm pore size), and rinsed with deionized water. The resulting aggregated MoS$_2$ nanosheets were then bath sonicated (Branson ultrasonic cleaner 3510) to redisperse in deionized water.

Example 11.2

Measurement and Analysis. A drop of an aggregated solution of MoS$_2$ was deposited on a holey carbon grid. Scanning transmission electron microscopy (STEM) imaging was performed using an aberration-corrected JEOL ARM-200F microscope equipped with a CEOS Cs probe-corrector on the illumination system. The images were collected using the high angle annular dark field (HHADF) detector. The probe size used for acquiring the HAADF-STEM images was 9 C (~23.2 pA). The collection angle used with a camera length of 8 cm ranges from 50 to 180 mrad. The lens aberrations were optimized by evaluating the STEM tableau using a standard gold nanoparticle sample. The accelerating voltage was set to 200 kV, and no beam-induced damage occurred during the observation of the sample. The images were collected using a dwell time of 31 μs; subsequently a maximum entropy deconvolution algorithm was applied to the images (DeConvHAADF is commercially available from HREM Research Inc.).

Example 12.1

Sample Preparation for Atomic Force Microscopy. The separated MoS$_2$ fractions were dialyzed in 750 mL of 2% w v$^{-1}$ SC bath for 48 hours to enable surfactant exchange. Prior to deposition, a SiO$_2$ substrate was rinsed with acetone, methanol, and deionized water and immersed in 2% Polyethylenimine (PEI) for 2 minutes to form a self-assembled monolayer. The substrate was then dried under nitrogen gas, rinsed in deionized water, and dried again. The samples were drop casted onto PEI-treated SiO$_2$ substrate for 5 minutes, dried under nitrogen gas, rinsed in deionized water, dried again, and annealed at 250° C. for 1 hour to remove residual surfactants and iodixanol. To increase the areal density of MoS$_2$ flakes, this process was repeated 5 to 10 times.

Example 12.2

Figure 13A:
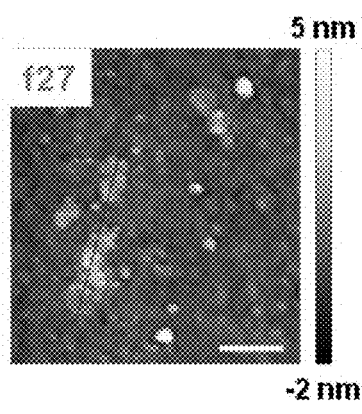
FIGS. 13A-B. AFM image (A) of $MoS_2$ nanosheets from f27 on a $SiO_2$ substrate, and the corresponding height profiles (B) along the dashed line (scale bar=100 nm).
Figure 13B:
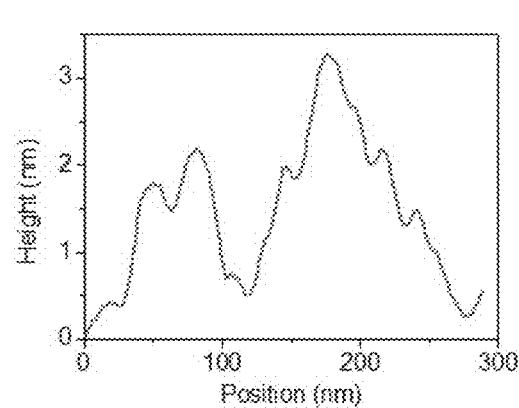

Flake Thickness Measurement and Analysis. AFM images were obtained using a Cypher S AFM in tapping mode. All images were 2 μm by 2 μm with identical scan conditions (NCHR AFM tips were used). An AFM image and line profile of the fraction f27 is shown in FIG. 13.

Example 13.1

Sample Preparation for Raman and Photoluminescence Spectroscopy. MoS$_2$ films were prepared via the vacuum filtration method. In particular, 2 mL of MoS$_2$ dispersion was filtered. The residual surfactant and iodixanol were then removed by rinsing with 30 mL of deionized water. The resulting film was immersed in ethanol and pressed firmly on to a SiO$_2$ substrate for 10 minutes by applying pressure with a 1.5 kg weight. To remove the membrane, the substrate was suspended above a boiling acetone bath at 85° C. at a 45° angle. After 15 minutes, the substrate was rinsed with ethanol, acetone, ethanol again, and deionized water, and then dried with nitrogen gas.

Example 13.2

Absorbance, Raman, and Photoluminescence Spectroscopy. Optical absorbance spectra were measured using a Cary 5000 spectrophotometer (Agilent Technologies). The contribution from the cuvette and F68 was measured as a baseline and then subtracted from the spectra of the MoS$_2$ dispersions. Please note that the UV-Vis spectra were measured over the wavelength range of 350 nm to 800 nm due to the strong absorbance by iodixanol at wavelengths below 350 nm. The Raman spectra and photoluminescence spectra of the MoS$_2$ nanosheets were obtained using an Acton TriVista Confocal Raman System with an excitation wavelength of 514 nm in multiple positions spaced at least several microns apart. For the comparison of photoluminescence intensity, micromechanically exfoliated monolayer MoS$_2$ was prepared via the scotch tape method, and PL spectra were obtained under identical measurement conditions (5× accumulation, 5000 ms exposure time, and identical filters) by keeping the laser focusing height identical (the laser is initially focused on the substrate, and then sample regions of interest are moved under the laser spot where Raman and PL spectra are subsequently taken at the same location) for each sample (FIG. 14).

Example 14

Characterization of DGU-Sorted TMD Nanosheets. Following DGU, the collected fractions of WS$_2$ were characterized using optical absorbance, Raman, and photoluminescence spectroscopy. Prior to the spectroscopic measurements, the measured buoyant densities of WS$_2$ were compared to the buoyant density model of $\sigma_{sc}$ and $\sigma_{F68}$, leading to similar conclusions as MoS$_2$. The optical absorbance spectra of fractions f6 and f12 in addition to the concentrated and ultrasonicated WS$_2$ dispersion before DGU were measured. The excitonic transition peak at ~615 nm is observed in all samples. Each WS$_2$ fraction was also characterized by Raman spectroscopy. In particular, a WS$_2$ film was prepared via vacuum filtration and transfer onto a SiO$_2$ substrate, and then Raman spectra were obtained using a beam size of ~1 μm with an excitation wavelength of 514 nm. The Raman spectrum from f12 has the in-plane 2LA mode at ~355.5 cm$^{-1}$ and the out-of-plane A1g mode at ~420.5 cm$^{-1}$, which are comparable to those of bulk WS$_2$. In contrast, the Raman spectrum from f6 shows a shift of ~4 cm$^{-1}$ in the $A_{1g}$ mode, which is consistent with the previously reported result for thin WS$_2$ nanosheets. Photoluminescence spectra from each fraction were also obtained using an excitation wavelength of 514 nm. The emission spectra from each fraction show a peak at ~615 nm that corresponds well to the absorption peak. The most buoyant f6 fraction with an enriched population of WS$_2$ monolayers shows significantly enhanced photoluminescence intensity as compared to f12. The spectra were normalized by the concentration of WS$_2$, which was determined from the optical absorbance spectra.

The buoyant density of MoSe$_2$ and WSe$_2$ fractions were measured and the average packing density of F68 on MoSe$_2$ and WSe$_2$ were calculated. In addition, each fraction was characterized using optical absorbance.

Example 15

Surface Coverage of Pluronic F68 on TMDs. As discussed above, before DGU, the following geometrical buoyant density model was used in order to assess the applicability of DGU to MoS$_2$ nanosheets:

$$\rho(N) = \frac{\rho_S N + 2m_{surf}\sigma + 2\rho_{H_2O}t_H}{(N+1)t_{MoS_2} + 2t_A + 2t_H} \quad (1)$$

where the packing density σ varies from 0.058 nm$^{-2}$ to 0.575 nm$^{-2}$ to account for the two extremes where the PPO chains cover the MoS$_2$ surface from 10% to 100%, which corresponds to the gray area in FIG. 10A. The hydration thickness $t_H$ was fixed by the average shell thickness based on the known micelle structure of Pluronic F68 using the following equation:

$$t_{H\_avg} = \frac{d_{F68\_avg} - d_{PPO\_Core}}{2} \quad (2)$$

where $t_{H\_avg}$ is the average hydration thickness, $d_{F68\_avg}$ is the average diameter of a Pluronic F68 micelle, and $d_{ppo\_core}$ is the average diameter of PPO core networks.

To assess the packing density and surface coverage of Pluronic F68 for each TMD, the experimental values were determined from their measured buoyant densities:

$$\sigma_{TMD} = \frac{\{(N+1)t_{TMD} + 2t_A + 2t_H\}\rho(N) - \rho_S N - 2\rho_{H2O}t_H}{2m_{surf}} \quad (3)$$

Using this model, the packing density and surface coverage of Pluronic F68 on each TMD is shown in Table 11. From these results, it is clear that the experimental packing density and surface coverage of F68 on TMDs are relatively lower than SC on graphene, likely due to the larger molecular weight and nonionic nature of Pluronic block copolymers. The packing density of Pluronic F68 on TMDs is correlated with the hydrophobicity of the TMDs, with the most hydrophilic $MoS_2$ showing the lowest surface coverage among the studied TMDs.

TABLE 11

Packing density and surface coverage of F68 on TMDs.

| | $MoS_2$ | $WS_2$ | $MoSe_2$ | $WSe_2$ | Graphene - SC[1] |
|---|---|---|---|---|---|
| Packing Density | 0.244 $nm^{-2}$ | 0.353 $nm^{-2}$ | 0.392 $nm^{-2}$ | 0.328 $nm^{-2}$ | 1.35 $nm^{-2}$ |
| Surface Coverage | 42.5% | 61.4% | 68.2% | 57.0% | 94% |
| Contact Angle[2–4] | 60° | 93° | — | 135-145° (500-650° C.) | 85° |

Example 16

$MoS_2$ Flake Lateral Size Measurement and Analysis. Scanning electron microscopy (SEM) images were obtained using a Hitachi SU 8030 FE-SEM. SEM images before and after DGU were obtained to compare the average lateral size of $MoS_2$ flakes and a lateral size histogram was obtained based on the images. According to the histogram, the average lateral size of flakes was significantly reduced after DGU, which leads to a blue shift in the optical absorption peaks of $MoS_2$ as observed previously. The lateral size histogram from the SEM images of f7 and f17 was also obtained and found to agree well with the histogram from the AFM images.

Example 17

Single-Layer $MoS_2$ Separation Yield Via DGU. 1 g/70 mL is the initial loading for the $MoS_2$-F68 dispersion. After two hours of tip sonication, 0.17 g of $MoS_2$ is suspended in solution, as determined by mass measurement of the residual $MoS_2$ slurry. The concentration step is then performed to remove all flakes greater than 5 nm in thickness and concentrate the remaining thin flakes. After the concentration step, only 0.027 mg of $MoS_2$ flakes with thickness below 5 nm remain. Based on AFM measurements, single-layer $MoS_2$ flakes constitute 24% of the overall mass of $MoS_2$ in the concentrated solution, which implies that the mass of suspended, single-layer $MoS_2$ is 0.0065 mg. In other words, the exfoliation yield of single-layer $MoS_2$ is ~0.00065%. This low exfoliation yield constitutes a remaining challenge to the field that is being actively addressed by emerging methods such as shear mixing and ball milling. In the meantime, this low exfoliation yield further motivates the need for effective separation methods such as DGU to isolate the minority single-layer species. After performing DGU, 0.002 mg of highly enriched single-layer $MoS_2$ is isolated as determined from optical absorbance spectroscopy and mass extinction coefficients that were quantified by inductively coupled plasma measurements. The ratio of the output of enriched single-layer $MoS_2$ (0.002 mg) to the total input single-layer $MoS_2$ (0.065 mg) implies a DGU yield of 30.8%.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

We claim:

1. A method for separating planar nanomaterials by thickness, the method comprising:
    centrifuging a transition metal dichalcogenide nanomaterial composition in contact with an aqueous fluid medium comprising a density gradient, wherein the transition metal dichalcogenide nanomaterial composition comprises one or more surface active components and a polydisperse population of planar transition metal dichalcogenide nanomaterials which is polydisperse at least with respect to thickness and has a mean thickness on the order of nanometers; and
    separating the transition metal dichalcogenide nanomaterial composition into two or more separation fractions each comprising a subpopulation of planar transition metal dichalcogenide nanomaterials from the polydisperse population, wherein the subpopulation of planar transition metal dichalcogenide nanomaterials in at least one of the two or more separation fractions has a mean thickness that is less than the mean thickness of the polydisperse population.

2. The method of claim 1, wherein the planar nanomaterials comprise $MoS_2$, $MoSe_2$, $WS_2$ or $WSe_2$ planar nanomaterials.

3. The method of claim 1, wherein the one or more surface active components comprise a planar organic group.

4. The method of claim 3, wherein the one or more surface active components is a copolymer of oxyethylene and oxypropylene.

5. A method for separating transition metal dichalcogenide nanomaterials by thickness, the method comprising:
    sonicating transition metal dichalcogenide in a first fluid medium to provide a transition metal dichalcogenide nanomaterial composition;
    centrifuging the transition metal dichalcogenide nanomaterial composition in contact with an aqueous second fluid medium comprising a density gradient, wherein the transition metal dichalcogenide nanomaterial composition comprises one or more surface active components and a polydisperse population of planar transition metal dichalcogenide nanomaterials comprising monolayer, bilayer, trilayer and n-layer transition metal dichalcogenide nanomaterials, where n is an integer in the range of 4 to 10; and
    separating the transition metal dichalcogenide nanomaterial composition into two or more separation fractions each comprising a subpopulation of planar transition metal dichalcogenide nanomaterials from the polydisperse population, wherein the subpopulation in at least one of the two or more separation fractions comprises greater than 50% of the monolayer transition metal dichalcogenide nanomaterials, bilayer transition metal dichalcogenide nanomaterials, trilayer transition metal dichalcogenide nanomaterials, or combinations thereof.

6. The method of claim 5, wherein the subpopulation in at least one of the two or more separation fractions comprises greater than 30% of the monolayer or bilayer transition metal dichalcogenide nanomaterials, or a combination thereof.

7. The method of claim 5, wherein the one or more surface active components comprise an amphiphilic compound having a planar core.

8. The method of claim 7, wherein the one or more surface active components is a copolymer of oxyethylene and oxypropylene.

9. The method of claim 5, wherein the planar nanomaterials comprise $MoS_2$, $WS_2$, $MoSe_2$ or $WSe_2$ planar nanomaterials.

10. The method of claim 5, wherein the transition metal dichalcogenide is $MoS_2$.

11. The method of claim 10, wherein the one or more surface active components is a copolymer of oxyethylene and oxypropylene.

12. The method of claim 11, wherein the subpopulation in one of the separation fractions comprises greater than 80% of the monolayer $MoS_2$.

13. A method for separating monolayer transition metal dichalcogenide nanomaterials, the method comprising:
centrifuging a transition metal dichalcogenide nanomaterial composition in contact with an aqueous fluid medium comprising a density gradient, wherein the transition metal dichalcogenide nanomaterial composition comprises one or more copolymers of oxyethylene and oxypropylene and a polydisperse population of planar transition metal dichalcogenide nanomaterials comprising monolayer, bilayer and trilayer transition metal dichalcogenide nanomaterials; and
separating the transition metal dichalcogenide nanomaterial composition into two or more separation fractions each comprising a subpopulation of planar transition metal dichalcogenide nanomaterials from the polydisperse population, wherein the subpopulation in one of the two or more separation fractions comprises greater than 50% of the monolayer transition metal dichalcogenide nanomaterials.

14. The method of claim 13, wherein the planar nanomaterials comprise $MoS_2$, $WS_2$, $MoSe_2$ or $WSe_2$ planar nanomaterials.

15. The method of claim 14, wherein the subpopulation in the one of the two or more separation fractions comprises greater than 80% of the monolayer transition metal dichalcogenide nanomaterial.

* * * * *